(12) United States Patent
Sen et al.

(10) Patent No.: US 11,777,892 B1
(45) Date of Patent: *Oct. 3, 2023

(54) MANAGEMENT OF QUERIES IN ELECTRONIC MAIL MESSAGES

(71) Applicant: Citigroup Global Markets Inc., New York, NY (US)

(72) Inventors: Deepesh Sen, Princeton, NJ (US); Itzel Herrera, Nutley, NJ (US); Sumantha Raghurama Shetty, Pune (IN); Prashant Rajendrakumar Shah, Pune (IN); Steve Morgan, Cliffside Park, NJ (US)

(73) Assignee: CITIGROUP GLOBAL MARKETS INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,911

(22) Filed: Feb. 9, 2023

Related U.S. Application Data

(63) Continuation of application No. 18/107,368, filed on Feb. 8, 2023.

(51) Int. Cl.
  *H04L 51/42* (2022.01)
  *H04L 51/08* (2022.01)
(52) U.S. Cl.
  CPC .............. *H04L 51/42* (2022.05); *H04L 51/08* (2013.01)
(58) Field of Classification Search
  None
  See application file for complete search history.

(56) References Cited

U.S. PATENT DOCUMENTS

| | | | | |
|---|---|---|---|---|
| 6,636,897 | B1 * | 10/2003 | Sherman | G06F 16/27 709/248 |
| 6,779,021 | B1 * | 8/2004 | Bates | G06Q 10/107 709/206 |
| 7,346,150 | B2 | 3/2008 | Frifeldt et al. | |
| 7,600,017 | B2 * | 10/2009 | Holtzman | G06Q 50/01 709/224 |
| 7,783,706 | B1 | 8/2010 | Robinson | |
| 8,949,956 | B1 | 2/2015 | Baldwin et al. | |
| 9,299,060 | B2 * | 3/2016 | Panzer | G06Q 10/10 |
| 9,660,832 | B2 * | 5/2017 | Koul | H04L 51/212 |
| 10,193,844 | B1 * | 1/2019 | Conley | H04L 51/214 |
| 10,560,415 | B1 * | 2/2020 | Rothman | H04L 51/224 |
| 10,904,697 | B2 | 1/2021 | Reitz et al. | |
| 11,438,297 | B2 * | 9/2022 | Rothman | H04L 51/224 |

(Continued)

*Primary Examiner* — Ranodhi Serrao
(74) *Attorney, Agent, or Firm* — Foley & Lardner LLP

(57) ABSTRACT

Presented herein are systems and methods for handling email messages. An application may identify, via the user interface, one or more properties defining a distribution list to assign a user of the client device. The application may transmit, to the server, the one or more properties to assign the user of the client device to the distribution list, with which at least one of a plurality of email messages to is selected for sending to the client device. The application may receive, from the server, an identification of a subset of email messages selected from the plurality of email messages based on an assignment of the user of the client device to the distribution list and content in the subset of email messages. The application may present, in the user interface, a message list of the subset of email messages.

18 Claims, 18 Drawing Sheets

(56) References Cited

U.S. PATENT DOCUMENTS

| | | | |
|---|---|---|---|
| 11,678,136 B1* | 6/2023 | Reitz | H04L 51/222 |
| | | | 455/456.2 |
| 2002/0099775 A1* | 7/2002 | Gupta | G06Q 10/107 |
| | | | 709/205 |
| 2002/0099777 A1 | 7/2002 | Gupta et al. | |
| 2003/0172118 A1 | 9/2003 | Bilansky et al. | |
| 2004/0006598 A1* | 1/2004 | Bargagli Damm | G06Q 30/02 |
| | | | 709/206 |
| 2005/0065632 A1* | 3/2005 | Douglis | H04L 9/40 |
| | | | 700/200 |
| 2006/0177005 A1* | 8/2006 | Shaffer | H04M 3/537 |
| | | | 379/67.1 |
| 2006/0177006 A1* | 8/2006 | Frifeldt | H04M 3/53333 |
| | | | 379/67.1 |
| 2006/0177009 A1* | 8/2006 | Skakkebaek | H04M 3/5307 |
| | | | 379/67.1 |
| 2006/0177024 A1* | 8/2006 | Frifeldt | H04M 3/53 |
| | | | 379/88.22 |
| 2007/0016647 A1* | 1/2007 | Gupta | G06Q 10/107 |
| | | | 709/206 |
| 2007/0043817 A1 | 2/2007 | Oliver et al. | |
| 2008/0147814 A1 | 6/2008 | Damm et al. | |
| 2008/0147815 A1* | 6/2008 | Damm | G06Q 30/02 |
| | | | 709/206 |
| 2010/0002852 A1 | 1/2010 | Schmidt et al. | |
| 2011/0289161 A1* | 11/2011 | Rankin, Jr. | H04L 51/216 |
| | | | 709/206 |
| 2015/0058324 A1* | 2/2015 | Kauwe | G06F 16/248 |
| | | | 707/722 |
| 2015/0256499 A1 | 9/2015 | Kumar et al. | |
| 2021/0144116 A1 | 5/2021 | Rothman et al. | |
| 2023/0120471 A1* | 4/2023 | Vembu | H04L 51/58 |
| | | | 709/206 |

* cited by examiner

MANAGEMENT OF QUERIES IN ELECTRONIC MAIL MESSAGES

CROSS-REFERENCE TO RELATED APPLICATIONS

This application is a continuation of U.S. patent application Ser. No. 18/107,368, filed Feb. 8, 2023, which is incorporated by reference.

TECHNICAL FIELD

This application generally relates to communications. In particular, the present application relates to managing and handling electronic mail messages.

BACKGROUND

A mail agent running on a computing device may be used by users to send and receive electronic mail messages with one another. A mail server may facilitate the transfer of electronic mail messages from one user to another user. When an electronic mail message identifies a particular user as a recipient, the mail server may forward the electronic mail message to the recipient user. Upon receipt, the electronic mail messages may be displayed in an inbox user interface of the mail agent. The inbox user interface can organize the electronic mail messages as such messages received. As more and more electronic mail messages are amassed by the recipient, the recipient's inbox may become cluttered and disorderly, resulting in a degradation in the quality of human computer interactions (HCI) between the user and the user interface of the mail agent. Without any means to organize the received messages, certain electronic mail messages may be missed by the user.

SUMMARY

Presented herein are systems and methods for managing and handling electronic mail messages. A sender may use a mail agent or application running on a client device to compose and send an electronic mail message to another user. The electronic mail message may include headers (e.g., identifying a recipient, sender, and subject), a body message, and one or more tags, among others. A mail server interfacing with the mail agent on the client device can receive and direct the electronic mail message using the recipient identified in the header of the electronic mail message. The recipient client device may receive the electronic mail message from the sender for display via a user interface for the recipient user. The user interface of the mail agent may include an inbox to display a list of received electronic mail messages and a message window to show Although the recipient user may use the mail agent to access and read received electronic mail messages, utility of the user interface of the mail agent may degrade as more and more electronic mail messages accumulate in the user's inbox. This is because the shear amount of electronic mail messages may become cluttered and disorderly, especially without additional organization of such messages. Such a cluttered inbox may lead to the user becoming frustrated with the mail agent, resulting in the degradation of the quality of human-computer interactions (HCI) between the user and the user interface of the agent. The disarrangement of the user interface of the mail agent may also lead to higher consumption of computing resources and more time, because the user may have to submit multiple search requests to find desired messages.

One attempt to addressing some of these problems may be to set up rules to classify emails based on header or body content of received electronic mail messages. This approach, however, may be cumbersome and tedious, because the user may have to manually set up such rules, defining individual keywords, senders, or recipients. Moreover, manually setting up rules may also provide limited and inflexible controls over the organization of the received electronic mail messages. These controls may result in over-inclusion of unwanted electronic mail messages and under-inclusion of desired electronic mail messages, still leaving much to be desired in the quality of HCI between the user and the mail agent.

To account for these and other technical problems, distribution lists assigned to various users may be used to identify electronic mail messages to bring to the recipient's attention. A mail handling application (also referred herein as a mail user agent) on a client device may provide a dialog box to select parameters defining which distribution list the user is to be assigned. The parameters may include, for example, a request type, a group identifier, and other information about the user. Upon selection, the mail handling application may send the parameters to the mail server. The mail server may receive the parameters defining the distribution list from the client device. Using the parameters, the mail server may identify the distribution list to which to assign the user.

With the assignment, whenever an electronic mail message is received, the mail server may check the distribution list for the recipient user. Using the distribution list, the mail server may parse the contents (e.g., header, body message, and tags) of the electronic mail message to determine whether the electronic mail message is to be assigned to the user. If the contents of the message is determined to correspond to the distribution list, the mail server may identify the electronic mail message as to be assigned. The mail server may send the message with an identification that the message is assigned to the user. For instance, when the content of the message corresponds to a request type for the distribution list, the mail server may determine that the message is to be brought to the attention of the user. On the other hand, if the contents of the message is determined to not correspond to the distribution list, the mail server may identify the electronic mail message as to be not assigned to the user. The mail server may forward the electronic mail message to the user, without any identification. Upon receipt, the mail handling application may present the electronic mail message in an inbox dedicated for messages selected using the distribution list to bring such messages to the user's attention.

In addition, the mail handling application in conjunction with the mail server may provide other various functionalities for administering the presentation of the electronic mail messages on the user interface. For example, from the list of electronic mail messages, the user of the application may identify a message to re-assign, and the application may send a request to change assignment to another user. The application (or the server) may also determine whether an electronic mail message that has been assigned to the user has been replied to within a set time window. If the set time window has passed without any replies by the user, the application may provide an escalation indication that the message has not been responded to. Furthermore, the application may also send an identification of the message to another user (e.g., a manager of the initial employee assigned to handling the email).

Upon request to convert electronic mail messages into online chat conversation, the application (or the server) may generate an online chat conversation by extracting main content in body message and removing auxiliary content (e.g., signatures, disclaimers, etc.) from a thread of messages. Conversely, upon receiving a request to convert an online chat conversation to an electronic mail thread, the application may interface with a chat application to retrieve the chat conversation thread. With the identification, the application may generate the electronic mail thread by adding electronic mail message formatting (e.g., headers, subject, and signature) to each of the chat conversations. Furthermore, the application may administer a user's calendar. Whenever a request to cancel an event is received, the application may identify another calendar event for the time slot as the canceled event, and may present the identified calendar event as a recommendation to the user. The application may also provide automatically generated responses for a query in an electronic mail message upon request.

In this manner, the mail handling application in combination with the mail server may improve the quality human-computer interaction (HCI) between the user and the electronic mail messages by providing an ability to manage arrangement of such messages. For example, use of the distribution list to select which electronic mail message to bring to the user's attention may reduce the cluttering and disorderliness of an inbox of the application, permitting the user to access relevant received messages and ability to quickly reply to such messages. The other capabilities of the user interface may further organize the electronic mail messages in the user interface of the mail handling application to improve the quality of HCI between the user and the application. These may also further reduce consumption of computing resources, from eliminating additional interactions to achieve similar results.

Aspects of present disclosure are directed to systems, methods, and non-transitory computer readable media for handling electronic mail messages in networked environments. The system may include a client device having one or more processors coupled with memory in communication with a server. The system may an application executable on the client device. The application may have a user interface for handling electronic mail messages. The application may identify, via the user interface, one or more properties defining a distribution list to assign a user of the client device. The application may transmit, to the server, the one or more properties to assign the user of the client device to the distribution list, with which at least one of a plurality of electronic mail messages to is selected for sending to the client device. The application may receive, from the server, an identification of a subset of electronic mail messages selected from the plurality of electronic mail messages based on an assignment of the user of the client device to the distribution list and content in the subset of electronic mail messages. The application may present, in the user interface, a message list of the subset of electronic mail messages.

In one embodiment, the application may receive, via the user interface, a request to present an electronic mail thread corresponding to a second subset of electronic mail messages, as a chat conversation thread. The application may identify, from each of the second subset of electronic mail messages, main content and auxiliary content, responsive to the request to present. The application may generate the chat conversation thread including the main content identified from each of the second subset of electronic mail messages, while excluding the auxiliary content. The application may present, in a message panel of the user interface, at least a portion of the chat conversation thread.

In another embodiment, the application may receive, via the user interface, a request to add a chat conversation thread from a second application as one of the subset of messages in the message list. The application may generate an electronic mail thread to include a second subset of messages corresponding to a plurality of conversations of the chat conversation thread. The application may present, via the message list, an identification of the electronic mail thread among a plurality of threads.

In yet another embodiment, the application may identify, from the subset of electronic mail messages, an electronic mail message for no response is sent within a defined time window after receipt. The application may provide, via the user interface, an indicator identifying the electronic mail message as having no response within the defined time window.

In yet another embodiment, the application may receive, via the user interface, a request to change assignment of an electronic mail message of the subset of electronic mail messages to another user. The application may transmit, to the server, an indication that the electronic mail message is to be assigned to the second distribution list, responsive to the request to change assignment of the electronic mail message. The application may remove the electronic mail message among the subset of electronic mail messages from presentation in the message list.

In yet another embodiment, the application may receive, via the user interface, a request to cancel a first calendar event corresponding to one of the subset of electronic mail messages. The application may identify, responsive to the request to cancel, a second calendar event for a time slot at least partially concurrent with the first calendar event. The application may present, via the user interface, an identification of the second calendar event.

In yet another embodiment, the application may provide, for at least one message of the subset of electronic mail messages, a response based on at least a portion of the at least one message. In yet another embodiment, the application may present, in a dashboard of the user interface, a statistic indicator associated with provision of the plurality of electronic mail messages to the client device in accordance with the distribution list.

In yet another embodiment, the application may provide, via an attachment window at least partially concurrently with the message list of the user interface, a plurality of attachments available to be added to at least one of the subset of messages. In yet another embodiment, the client device may include a mobile communication device in communication with the server on a cloud computing network. The user interface may have a size corresponding to a display of the mobile communication device.

Aspects of present disclosure are directed to systems, methods, and non-transitory computer readable media for managing electronic mail messages in networked environments. The system may include at least one server having one or more processors coupled with memory in communication with a plurality of client devices. The at least one server may receive one or more properties defining a distribution list to assign a user associated with a client device of the plurality of client devices. The at least one server may identify, from a plurality of distribution lists, the distribution list to which to assign the user based on the one or more properties. The at least one server may select, from a plurality of electronic mail messages to be sent to the client device, a subset of electronic mail messages based on assignment of the user to the distribution list and content in the subset of electronic mail messages. The at least one server may transmit, to the client device, an identification of the subset of electronic mail messages for presentation in a message list of a user interface.

In one embodiment, the at least one server may receive, from the client device, a request to present an electronic mail thread corresponding to a second subset of electronic mail messages, as a chat conversation thread. The at least one server may identify, from each of the second subset of electronic mail messages, main content and auxiliary content, responsive to the request to present. The at least one server may generate the chat conversation thread including the main content identified from each of the second subset of electronic mail messages, while excluding the auxiliary content. The at least one server may send, to the client device, the chat conversation thread for presentation in a message panel of the user interface.

In another embodiment, the at least one server may receive, from the client device, a request to add a chat conversation thread from a second application as one of the subset of messages in the message list. The at least one server may generate an electronic mail thread to include a second subset of messages corresponding to a plurality of conversations of the chat conversation thread. The at least one server may send, to the client device, an identification of the electronic mail thread among a plurality of threads for presentation in the message list.

In yet another embodiment, the at least one server may identify, from the subset of electronic mail messages, an electronic mail message for no response is sent within a defined time window after receipt. The at least one server may send, to the client device, an indicator identifying the electronic mail message as having no response within the defined time window via the user interface.

In yet another embodiment, the at least one server may receive, from the client device, a request to change assignment of an electronic mail message of the subset of electronic mail messages to another user. The at least one server may identify, from a plurality of users, a second user to which to assign the electronic mail message based on the request to change. The at least one server may send, to a second client device associated with the second user, an identification of the electronic mail message.

In yet another embodiment, the at least one server may receive, from the client device, a request to cancel a first calendar event corresponding to one of the subset of electronic mail messages. The at least one server may identify, responsive to the request to cancel, a second calendar event for a time slot at least partially concurrent with the first calendar event for the user. The at least one server may send, to the client device, an identification of the second calendar event for the user.

In yet another embodiment, the at least one server may select, from a plurality of distribution lists, the distribution list for the user based on the one or more properties received from the client device. In yet another embodiment, the at least one server may generate, for at least one message of the subset of electronic mail messages, a response based on at least a portion of the at least one message. In yet another embodiment, the at least one server may comprise at least one of a mail exchange server or a dedicated server for interfacing with an application for handling messages executing on the client device. In yet another embodiment, the at least one server may be distributed in a cloud computing network in communication with the plurality of client devices It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and together with the specification, explain the subject matter of the disclosure.

DETAILED DESCRIPTION

Figure 1:
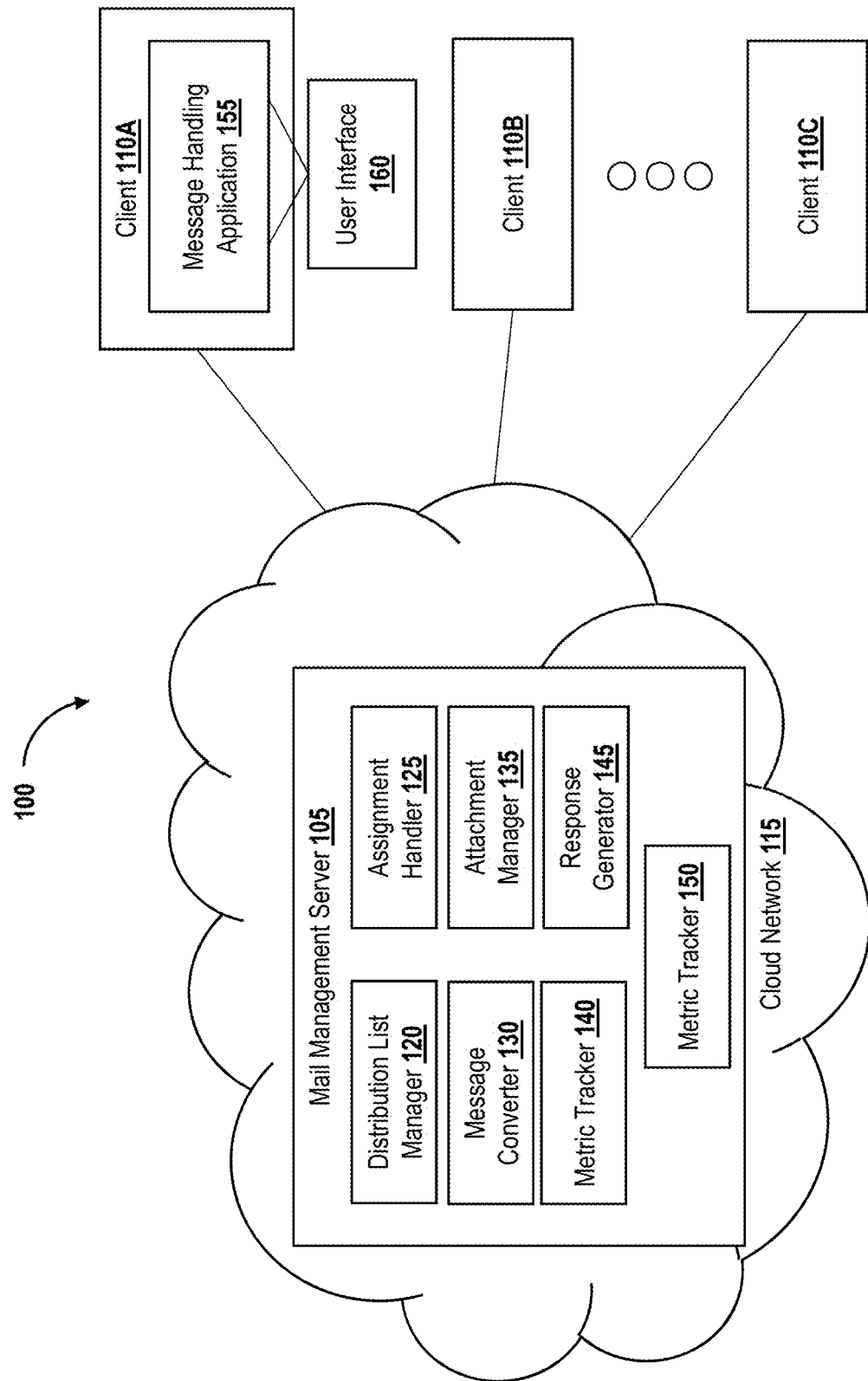
FIG. 1 depicts a block diagram of an example system for managing and handling electronic mail messages in accordance with an illustrative embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

The present disclosure is directed to systems and methods for managing and handling electronic mail messages. Users of an electronic mail message service may be assigned to one or more distribution lists based on parameters configured by the users. The distribution lists may include one or more users (recipients), and the message may be intended for one or more of the users. The parameters may include, for example, a request type, a group identifier, and other information about the user. Once assigned, the server may determine that an electronic mail message directed at the user is to be brought to the user's attention based on the contents of the message as well as the distribution list to which the user belongs. From the determination, the server may provide an identification that the electronic mail message is assigned to the user to a client device associated with the user. Upon receipt, a mail management application on the client device may include the identified message in a list of messages (e.g., inbox) assigned to the user. In this manner, the cluttering and disorderliness of the message list can be reduced, thereby improving human-computer interaction (HCI) between the user and the application and freeing up consumption of computing resources that would have been spent in additional interactions to access messages.

FIG. 1 depicts a block diagram of a system 100 for binding web components to protect accessing of resources. The system 100 may include at least one mail management server 105 and one or more clients 110A-N(hereinafter generally referred to as clients 110) communicatively coupled via at least one cloud network 115. The mail management server 105 may include at least one distribution list manager 120, at least one assignment manager 125, at least one message converter 130, at least one attachment manager 135, at least one calendar manager 140, at least one response generator 145, at least one metric tracker 150, among others. At least one client 110 may include at least one message handling application 155 to provide at least one user interface 160. Embodiments may comprise additional or alternative components or omit certain components from those of FIG. 1, and still fall within the scope of this disclosure.

Various hardware and software components of one or more public or private networks (e.g., over the cloud network 115) may interconnect the various components of the system 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols, among others.

The cloud computing network 115 may include a cloud computing environment, with one or more nodes (e.g., one or more servers) can be distributed over multiple sites (e.g., data centers). The cloud computing network 115 may be used to implement or execute the mail management server 105 and its components, such as the distribution list manager 120, the assignment manager 125, the message converter 130, the attachment manager 135, the calendar manager 140, at least one response generator 145, the metric tracker 150, among others. For instance, the distribution list manager 120 and the assignment manager 125 may be executed on servers at one site, while the message converter 130, the attachment manager 135, the calendar manager 140, at least one response generator 145, the metric tracker 150 may be run out of other sites. The cloud computing network 115 may be setup in accordance with any number of service models, such as an infrastructure as a service (IaaS), a platform as a service (PaaS), or a software as a service (SaaS), among others.

The client 110 may be any computing device comprising one or more processors coupled with memory and software, and capable of performing the various processes and tasks described herein. The client 110 may be, for example, a desktop, a thin client, a laptop, a tablet, and a mobile phone, among others. The client 110 may be in communication with the mail management server 105, via the cloud network 115. Communications from the client 110 may be redirected via the network 115 from one component to another. The client 110 may run the message handling application 155 to handle the selection and presentation of the messages on the display via the user interface 160. The user interface 160 may be sized to fit the display form of the client 110. In some embodiments, when the client 110 is a mobile communication device (e.g., a smartphone or tablet), the user interface 160 may have a size corresponding to or matching size of the display of the client 110.

The message handling application 155 may be a web application to access functionalities provided by the mail management server 105. In some embodiments, the message handling application 155 may be an instance of an application for which the resources are hosted on the mail management server 105 of the cloud network 115. For instance, the message handling application 155 may be a part of a software as a service (SaaS) platform managed through the mail management server 105 and its components on the cloud network 115. With this arrangement, the functionalities of the message handling application 155 may be shared with the mail management server 105. The user interface 160 may have a message list (also referred herein as an electronic mailbox) to present a set of messages or threads received by the message handling application 155, a message panel to display the content of messages, and other user interface elements to manage the presentation of the messages, among others. The message handling application 155 may interface with the cloud computing network 115 to access the mail management server 105.

The mail management server 105 may be any computing device comprising one or more processors coupled with memory and software, and capable of performing the various processes and tasks described herein. In some embodiments, the mail management server 105 may include a mail exchange server facilitating the delivery of electronic mail messages to the set of clients 110. In some embodiments, the mail management server 105 may include one or more servers distributed in the cloud network 115. The servers may be dedicated for interfacing with instances of the mail handling applications 155 on the clients 110. For instance, the servers on the cloud network 115 may host and provide resources for web applications corresponding to the mail handling applications 155 accessed via the client 110. The mail management server 105 may be in communication with the client 110, via the network 115. Although shown as a single mail management server 105, the mail management server 105 may include any number of computing devices. The mail management server 105 may host, maintain, or otherwise carry various functions for mail exchange among the client 110.

Within the mail management server 105, the distribution list manager 120 may be or may include computer-readable machine code executable by the mail management server 105 to assign users to a distribution list composed of a subset of users. The assignment handler 125 may be, or may include, computer-readable machine code executable by the mail management server 105 to receive electronic messages and transmit them to a subset of users within a distribution list based on certain criteria. The message converter 130 may be, or may include, computer-readable machine code executable by the mail management server 105 to visually convert electronic mail conversation threads into a chat interface by removing auxiliary content from the electronic mail. The message converter 130 may also be, or include, computer-readable machine code executable by the mail management server 105 to integrate various chat platforms into a user's electronic mailbox as an electronic mail message. The attachment manager 135 may be, or may include, computer-readable machine code executable by the mail management server 105 to compile attachments within an electronic mail conversation thread and present the attachments to a user in a consolidated location.

In addition, the calendar manager 140 may be, or may include, computer-readable machine code executable by the mail management server 105 to determine a priority of calendar events and subsequently accept pending or declined events upon the occurrence of a predefined event. The response generator 145 may be, or may include, computer-readable machine code executable by the mail management server 105 to receive electronic mail messages, determine that the received electronic mail message contains a request, interpret the request, and automatically generate a responsive reply with relevant information. The metric tracker 150 may be, or may include, computer-readable machine code executable by the mail management server 105 to monitor at least one message center, track various predefined metrics based on characteristics of the electronic mail messages received by the at least one message center, and display the various tracked messages on user interface 160. The message handling application 155 on the client 110 may share similar functionalities as the mail management server 105.

Figure 6:
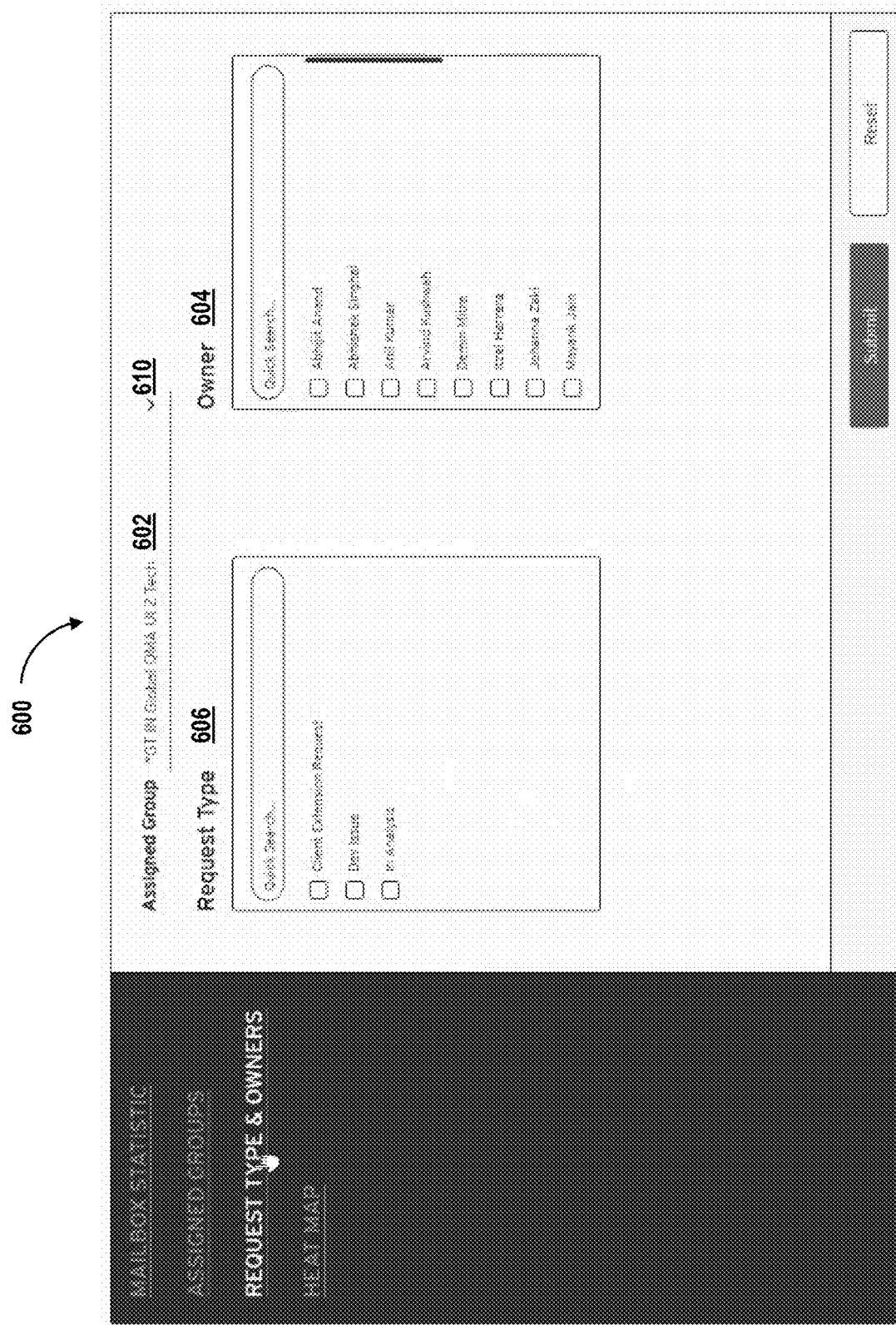
FIG. 6 depicts a screenshot of a dialogue box for selecting parameters to define a distribution list to which to assign a user in accordance with an illustrative embodiment.

The message handling application 155 executing on the client 110 may receive, retrieve, or otherwise identify one or more properties defining at least one distribution list to which to assign a user of the client 110. The properties may identify or include, for example: a user identifier referencing the user, the client 110, or the individual instance of the message handling application 155; a request type of electronic mail messages the user is to be assigned to respond to; a geographic region or location in which the user is located; group identifier referencing which group the user belongs to in an organization or association; and other information. The properties may be used to select which distribution list the user of the client 110 is to be assigned. At least a portion of the properties may be inputted by the user via the user interface 160 of the message handling application 155. For example, upon request, the message handling application 155 may provide a dialogue box in the user interface 160 in which the user can input the properties for defining the distribution list. The dialogue box may be in the form as shown in FIG. 6.

With identification, the message handling application 155 may provide, send, or otherwise transmit the one or more properties to assign the user to the distribution list to the mail management server 105. With detection of an interaction with the user interface 160 to input the properties for the distribution list, the message handling application 155 may send the one or more properties to the mail management server 105. In some embodiments, the message handling application 155 may add information to the properties, outside of those inputted via the user interface 160, upon detection of the interaction. For instance, upon completion of the dialogue box for defining the distribution list on the user interface 160, the message handling application 155 may add the user identifier to the properties and transmit the properties to the mail management server 105.

The distribution list manager 120 executing on the mail management server 105 may obtain, identify, or otherwise receive the one or more properties to assign the user of the client 110. The one or more properties may be received via the user interface 160 of the message handling application 155 running on the client 110. The distribution list manager 120 may process or parse the one or more properties to identify information (e.g., the request type or group identifier) inputted by the user of the client 110 and included by the message handling application 155. Upon receipt, the distribution list manager 120 may store and maintain the properties on a database accessible to the mail management server 105 (e.g., on the cloud network 115). In some embodiments, the distribution list manager 120 may automatically generate the parameters, independently from inputting via the mail handling application 155. For example, the distribution list manager 120 may use organizational data identifying the users by associated group to produce the parameters defining which distribution list the user is to be assigned.

Using the one or more properties, the distribution list manager 120 may select or identify at least one distribution list to which to assign the user of the client 110. The distribution list manager 120 may maintain a set of distribution lists for users accessing respective instances of the message handling application 155 running on clients 110. Each distribution list may define or specify a combination of parameters (e.g., request types and group identifiers) with which to assign the user to the respective distribution list. To identify, the distribution list manager 120 may compare the one or more properties from the user with the specification of parameters for each distribution list. If the properties from the user do not match the specification, the distribution list manager 120 may refrain from assigning the user to the distribution list. Otherwise, if the properties from the user match the specification, the distribution list manager 120 may assign, set, or otherwise associate the user to the distribution list. The user may be assigned to one distribution list or multiple distribution lists.

The assignment handler 125 executing on the mail management server 105 may identify or receive a set of electronic mail messages to be sent to the user of the client 110. For example, the assignment handler 125 executing on the mail management server 105 operating as a mail exchange service can identify the electronic mail messages identifying the user of the client 110 as the recipient of the message. In some embodiments, the assignment handler 125 may intercept electronic mail messages in route to the client 110. In some embodiments, the assignment handler 125 may retrieve, obtain, or identify the set of electronic mail messages already received at the client 110. For instance, the assignment handler 125 may interface with a mail agent running on client 110 to identify the received electronic mail messages.

Each electronic mail message (sometimes herein referred to as an electronic mail or e-mail) may include at least one header and at least one body message. The header and body message may be in accordance with a syntax. The header may include, for example: a sender (e.g., a from field) identify the writer of the message; a timestamp (e.g., date, hour, minute, and seconds); one or more recipients (e.g., a To field, carbon copy (CC) field, and blind carbon copy (BCC) field) to which the message is to be sent; a message identifier uniquely identifying a particular electronic mail message or thread; a reply-to identifier corresponding to the message identifier corresponding to an electronic mail message which a subsequent electronic mail message is responding to; a subject including a descriptor of the body message; and content type identifying a formatting of the message (e.g., plaintext, rich text, or HyperText Markup Language (HTML), among others. The body message may include content corresponding to a message composed by the sender and to be viewed by the recipients.

Based on the assignment of the user to one of the distribution lists and the content in the electronic mail messages, the assignment handler 125 may select a subset of electronic mail messages for the user. From among the electronic mail messages to be sent to the user, the selected messages may correspond to those that are to be brought to the attention of the user. Each distribution may define or specify criteria for selecting the subset of electronic mail messages for the user. The criteria may include, for example, keywords or phrases correlated with a request type and group associated with the distribution list. For instance, for a financial institution, the distribution list associated with email addresses of securities brokers may include keywords or phrases, such as "purchase order," "order status," and ticker names, among others. Electronic mail messages with such keywords in the subject or body may be selected to bring to attention to the user of the mail management application 155.

With the identification of the messages to be sent to the user, the assignment handler 125 may process or parse each electronic mail message to extract or identify the contents of the electronic mail message, such as the headers and the body message. Upon extraction, the assignment handler 125 may compare keywords from the content with the selection criteria for the distribution. Continuing from the previous example, the assignment handler 125 may scan the subject and body message to determine whether there are any keywords or phrases for the distribution list for securities brokers. If there are no content in the electronic mail message that match the selection criterion, the assignment handler 125 may exclude the electronic mail message from selection for the user. The assignment handler 125 may also determine that the electronic mail message is to be excluded from the distribution list to which the user is assigned. On the other hand, if there are content in the electronic mail message that does match the selection criterion, the assignment handler 125 may include or select the electronic mail message for the user. The assignment handler 125 may also determine that the electronic mail message is to be selected for the distribution list to which the user is assigned.

In some embodiments, the assignment handler 125 may apply a natural language processing (NPL) algorithm to the content of the electronic mail message. The NPL algorithm may include, for example, automated summarization, information retrieval, topic recognition, named entity recognition, or lexical semantics analysis (e.g., using a knowledge graph), among others to analyze the content of the electronic mail message. With the application of the NPL algorithm, the assignment handler 125 may produce or generate additional keywords, phrases, or other output from the content, with which to compare against the selection criterion of the distribution list. For instance, from applying the NPL algorithm to the body message, the assignment handler 125 may generate an output indicting that an electronic mail message contains content pertinent to security purchase orders. The assignment handler 125 may compare the output with the selection criterion of the distribution list as discussed above.

With the selection, the assignment handler 125 may provide, send, or otherwise transmit an identification of the subset of the electronic mail messages to the client 110 for presentation in an electronic mailbox of a user interface 160 of the message handling application 155. The identification may reference the selected electronic mail messages to be brought to the user's attention, and may include instructions to the message handling application 155 to display the selected electronic mail messages separately from the unselected messages in the user interface 160. In some embodiments, the assignment handler 125 may include the identification into the electronic mail message itself, for example, into the subject line or in the body message. In some embodiments, the assignment handler 125 may transmit the identification to the message handling application 155, separately from the electronic mail messages.

From the mail management server 105, the message handling application 155 may receive the identification of the subset of the electronic mail messages selected based on the assignment of the user to the distribution list and the content of the electronic mail messages. The message handling application 155 may receive the identification together with or separately from the electronic mail messages.

The message handling application 155 may display, render, or otherwise present the selected subset of electronic mail messages in a message list of the user interface 160. The message list may be one or more elements of the user interface 160 for displaying the selected electronic mail messages as identified using the distribution list. The message list may catalogue the selected electronic mail messages (or threads) in a chronological sequence in order of sent or received time. The user interface 160 may also include message panel to present the content of one of the electronic mail message selected on the message list. The message list and message panel of the user interface 160 may, for example, be of the form in FIGS. 7-10. In some embodiments, the message list may include at least one element to enable the user to view all the electronic mail messages received by the user, including the messages excluded using the distribution list.

In some embodiments, the message handling application 155 may identify, from the subset of electronic mail messages, an electronic mail message for which no response is sent within a defined time window after receipt. Upon receipt of each electronic mail message, the message handling application 155 may maintain a timer to keep track time of elapsed since receipt of the electronic mail message. The timer may be maintained for each electronic mail message selected using the distribution list. The defined time window may identify a span of time in which the message is to be responded by the user, for example, by creating and sending a response message. The time window may range, for example, between 3 days to 1 month. The message handling application 155 may compare the elapsed time to the defined time window. If the elapsed time does not exceed the time window, the message handling application 155 may continue to monitor for responses by the user to electronic mail message. If a response is detected within the time window, the message handling application 155 may deactivate or remove the timer for the electronic mail message.

If no response is detected within the time window, the message handling application 155 may initiate an escalation procedure. As part of the procedure, upon identification of the electronic mail message receiving no response within a defined time window after receipt, the message handling application 155 may present provide in the message panel of the user interface 160 an indicator. The indicator may identify the electronic mail message as having no response within the defined time window. The message handling application 155 may also send an indication to the mail management server 105 that another user in the same distribution list as the user is to be notified. Upon receipt, the assignment handler 125 on the mail management server 105 may identify one or more users in the same distribution list as the user. With the identification, the assignment handler 125 may provide the notification along with the electronic mail message itself to the other user.

In some embodiments, the assignment handler 125 on the mail management server 105 may identify the defined time window has passed with no response. The functionality of the assignment handler 125 may be similar to the message handling application 155 with respect to escalation as discussed above. The assignment handler 125 may identify, from the subset of electronic mail messages, an electronic mail message for no response is sent within a defined time window after receipt. Upon identification of an electronic mail message receiving no response within a defined time window after receipt, the assignment handler 125 may send or transmit an indicator to the client 110. The indicator may identify the electronic mail message as having no response within the defined time window. Upon receipt, the message handling application 155 may present the in the message list or panel of the user interface 160.

In some embodiments, the message handling application 155 may identify or receive from a user, via the user interface 160, a request to change assignment of at least one electronic mail message of the subset of electronic mail messages to another user. The request may identify the electronic mail message for which the assignment is to be changed to another user or another distribution list. The request may be generated via a dialogue box of the user interface 160, with which the user can identify the electronic mail message as well as one or more parameters (e.g., request type or group) for defining a distribution list or the specific distribution list. For instance, the user may use the user interface 160 to request that one or more electronic mail messages in the message list is to be reassigned another user.

Upon receipt, the message handling application 155 may provide, send, or otherwise transmit an indication that the electronic mail message is to be assigned to a second distribution list. The indication may be transmitted to the mail management server 105 in response to receipt of the request to change assignment. In conjunction, the message handling application 155 may remove the electronic mail message among the subset of electronic mail messages in the message list from presentation on the user interface 160. The removed electronic mail message may be accessible through the user interface 160 when the user requests for display of all received electronic mail messages.

In some embodiments, the assignment handler 125 executing on the mail management server 105 may receive from a user, via client 110, a request to change assignment of an electronic mail message of a subset of electronic mail messages to another user. The request may include or identify the electronic mail message as well as one or more parameters for defining a distribution list or the specific distribution list. In some embodiments, the assignment handler 125 may invoke the distribution list manger 120 to identify at least one other distribution list using the parameters from the request. In some embodiments, from invoking the distribution list manger 120, the assignment handler 125 may identify at least one other user in the other distribution list to which to reassign the electronic mail message.

Upon identification, the assignment handler 125 may provide, send, or transmit an indication that the electronic mail message is to be assigned to the other user (or the other distribution list). The assignment handler 125 may then send an indication to client 110 to remove the electronic mail message among the subset of electronic mail messages in the message list from presentation in the user's electronic mailbox as displayed on user interface 160. In addition, the assignment handler 125 may also send the indication to another client 110 of the identified user to which the electron mail message is to be reassigned. The assignment handler 125 may provide, send, or otherwise forward the electronic mail message that is assigned to the client 110 of the other identified user.

With the presentation of the electronic mail messages, the message handling application 155 may detect, identify, or otherwise receive a request to present an electronic mail thread as a chat conversation thread, via the user interface 160. The request may be detected via an interaction with a user interface element of the user interface 160. The request may identify a set of electronic mail messages corresponding to an electronic mail thread that is to be converted to a chat conversation thread. The electronic mail thread may, for example, correspond to a set or chain of electronic mail messages among senders and recipients, with the same message identifier in the reply-to field.

Upon receipt of the request, the message handling application 155 may extract or identify main content and auxiliary content from the set of electronic mail messages corresponding to the electronic mail thread. Both the main content and the auxiliary content may be part of the body message of the set of electronic mail message. The main content may correspond to a portion of the body message including primary text and other content, such as the salutation and one or more subsequent paragraphs, generally toward the beginning and middle of the body message. The auxiliary content may correspond to the remaining portions of the message may, such as a closing message (e.g., "Best [name]"), signatures, and disclaimers generally toward the end of the body message.

In some embodiments, the message handling application 155 may recognize, detect, or otherwise identify the auxiliary content in the body message of each electronic mail message of the thread. For example, the message handling application 155 may use template defining text correlated with auxiliary content. The message handling application 155 may perform matching to compare against the contents of the body message. If there is a match, the message handling application 155 may identify the matching portions as auxiliary content, and the remaining portion as main content.

The message handling application 155 may generate a chat conversation thread to include the main content, while excluding the auxiliary content from the electronic mail messages corresponding to the electronic mail thread. In some embodiments, the message handling application 155 may add time stamps from the headers of the electronic mail messages forming the thread. The message handling application 155 may format the main content of the electronic mail thread to convert to the chat conversation thread. For instance, the message handling application 155 may set the font of the text in the main content in unison, remove indentations, and include time stamps, among other formatting changes to conform to specifications of the chat conversation thread. With the conversion, the message handling application 155 may present at least a portion of the chat conversation thread in the message panel of the user interface 160. An example of the conversion from the electronic mail message to the chat conversation message is shown on FIGS. 16A and 16B.

In some embodiments, the message converter 130 executing on the mail management server 105 may perform the conversion of the electronic mail thread to present as the chat conversation thread. The conversion of the electronic mail thread to the chat conversation thread may be similar as discussed above. The message converter 130 may receive the request to present the electronic mail thread as the chat conversation thread via the interaction with the user interface 160 from the client 110. Upon receipt of the request, the message converter 130 may identify main content and auxiliary content from a set of electronic mail messages corresponding to the electronic mail thread. The message converter 130 may generate a chat conversation thread to include the main content, while excluding the auxiliary content from the electronic mail messages corresponding to the electronic mail thread. The message converter 130 may send the chat conversation thread to the client 110 for presentation of at least a portion of the chat conversation thread in the message panel of the user interface 160.

Conversely, the message handling application 155 may identify or receive a request to add a chat conversation thread from another application as one of the subset of electronic mail messages in the message list. The chat conversation thread may not be handled by the message handling application 155, but by another application. The other application may be a chat conversation application, such as Symphony Communication™, Slack™, and WhatsApp™ among others. The message handling application 155 may interface with the chat conversation application to fetch, retrieve, or otherwise identify the chat conversation thread therefrom. The request may identify the particular chat conversation thread to be converted to a subset of electronic mail messages to form an electronic mail thread.

Upon receipt of the request, the message handling application 155 may output, produce, or otherwise generate an electronic mail thread using a set of conversations of the chat conversation thread. The conversation thread may identify participants. Each conversation may correspond to at least one message communicated from a sender to a recipient. To generate, the message handling application 155 may format the conversations of the chat conversation thread in accordance with the electronic mail thread. For instance, the message handling application 155 may use the identifiers for the sender and recipient from the chat conversation to the sender and recipient fields of the header of a respective electronic mail message. In addition, the message handling application 155 may add the message of each chat conversation into the body message of the corresponding electronic mail message. With the generation, the message handling application 155 may display or present on the message list of the user interface 160 an identification of the electronic mail thread among a plurality of threads. Upon selection of the electronic mail thread in the message list, the message handling application 155 may display the corresponding set of electronic mail messages in the message panel of the user interface 160. An example of the conversion from the chat conversation message to the electronic mail message is shown on FIG. 15.

In some embodiments, the message converter 135 executing on the mail management server 105 may receive a request to add a chat conversation thread from a second application as one of the subset of messages in the message list. The addition of the chat conversation thread may be similar to the addition by the message handling application 155, as discussed above. Upon receipt of the request, the message converter 135 may generate an electronic mail thread to include a second subset of messages corresponding to a plurality of conversations of the chat conversation thread. The message converter 135 may then provide the electronic mail thread to the mail management application 155 on the client 110 to present an identification of the electronic mail thread among a plurality of threads on the user interface 160.

The message handling application 155 may identify a set of attachments (e.g., files or other messages) available to be added to the electronic mail messages in the message list of the user interface 160. The message handling application 155 may provide one or more user interface elements to select the set of attachments via the user interface 160. For instance, the message handling application 155 may provide a file directory window via which the user can navigate the file hierarchy of the client 110 or other cloud storage services to select files for attachments. Upon selection, the message handling application 155 may provide the set of attachments available to be added to at least one of the electronic mail messages via an attachment window at least partially concurrently with the message list of the user interface 160.

In some embodiments, the attachment manager 135 executing on the mail management server 105 may provide, via an attachment window at least partially concurrently with the message list of the user interface, a set of attachments available to be added to at least one of the subset of messages. The provision of the set of attachments may be similar as discussed above. The attachment manager 135 may receive the selection of attachments via the user interface 160 of message handling application 155. Upon selection, the message handling application 155 may provide the identification of the attachments for presentation via a separate window or list on the user interface 160.

The message handling application 155 may identify or receive a request to cancel a first calendar event via the user interface 160. The calendar event may correspond to one of the subset of electronic mail messages that was previously received and accepted by the user of the client 110. The request itself may identify the calendar event to be canceled. For instance, the user of the message handling application 155 may interact with a user interface element corresponding to the calendar event to open up a window identifying details of the calendar event to cancel the calendar event. The message handling application 155 may detect the interaction with the window to cancel as the request to cancel.

Upon receipt of the request, the message handling application 155 may identify a second calendar event for a time slot at least partially concurrent with the first calendar event. The message handling application 155 may identify selected electronic mail messages corresponding to calendar events. From the identified calendar events, the message handling application 155 may identify another calendar event at least partially overlapping with the canceled calendar event. With the identification of the calendar event, the message handling application 155 may present an identification of the calendar event as a recommendation to replace the canceled calendar event on the user interface 160.

In some embodiments, the calendar manager 140 executing on the mail management server 105 may receive a request to cancel a first calendar event corresponding to one of the subset of electronic mail messages. The handling of the request to cancel by the calendar manager 140 on the mail management server 105 may be similar to the handling of the request to cancel as discussed above. Upon receipt of the request, the calendar manager 140 may identify a second calendar event for a time slot at least partially concurrent with the first calendar event. With the identification of a second calendar event, the calendar manager 140 may provide on the user interface 160 the identification of the second calendar event.

The message handling application 155 may provide a response for at least one of the electronic mail messages in the user interface 160. The response may be automatically generated using at a portion of the content (e.g., the header or the body message) of the electronic mail message. In some embodiments, the message handling application 155 may detect, identify, or otherwise receive a request to provide an automated response via the user interface 160 or from the content of the electronic mail message itself. The request may identify the electronic mail message for which the automated response is to be generated. The response may be provided as a draft electronic mail message for the user of the client 110 to reply to the sender.

Figure 17:
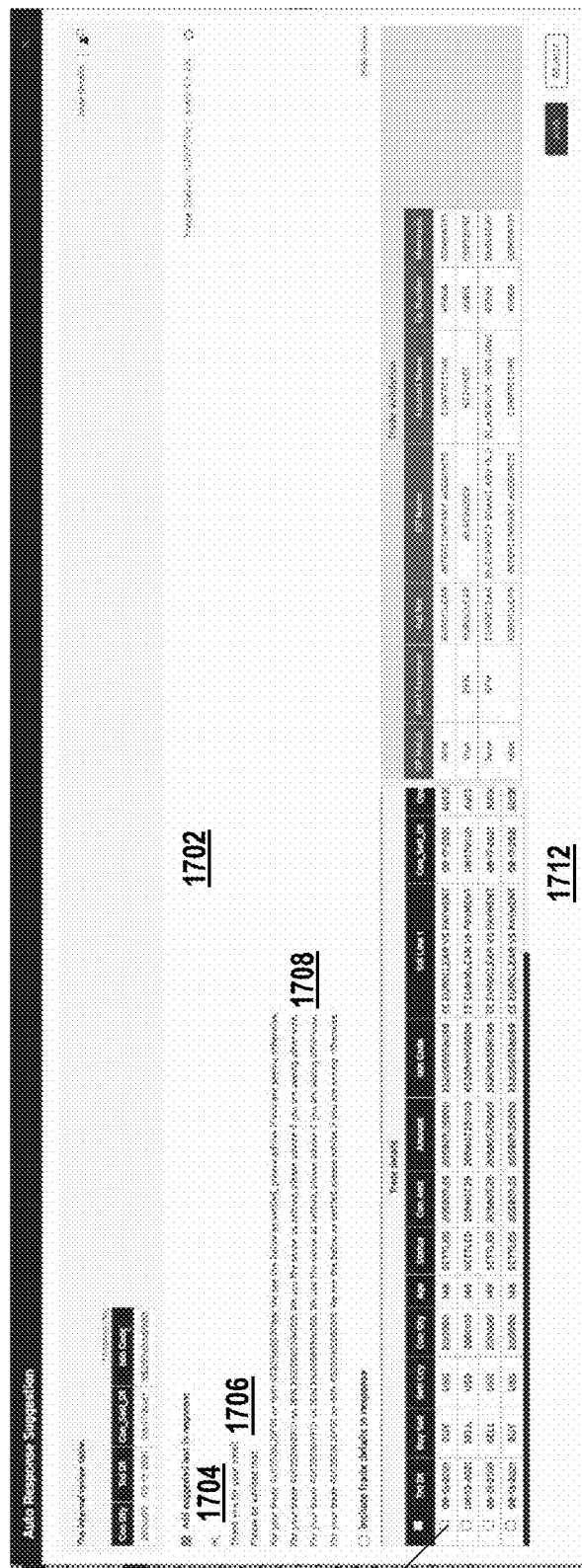
FIG. 17 depicts a screenshot of a dialogue box for suggested automated responses in accordance with an illustrative embodiment.
Figure 18:
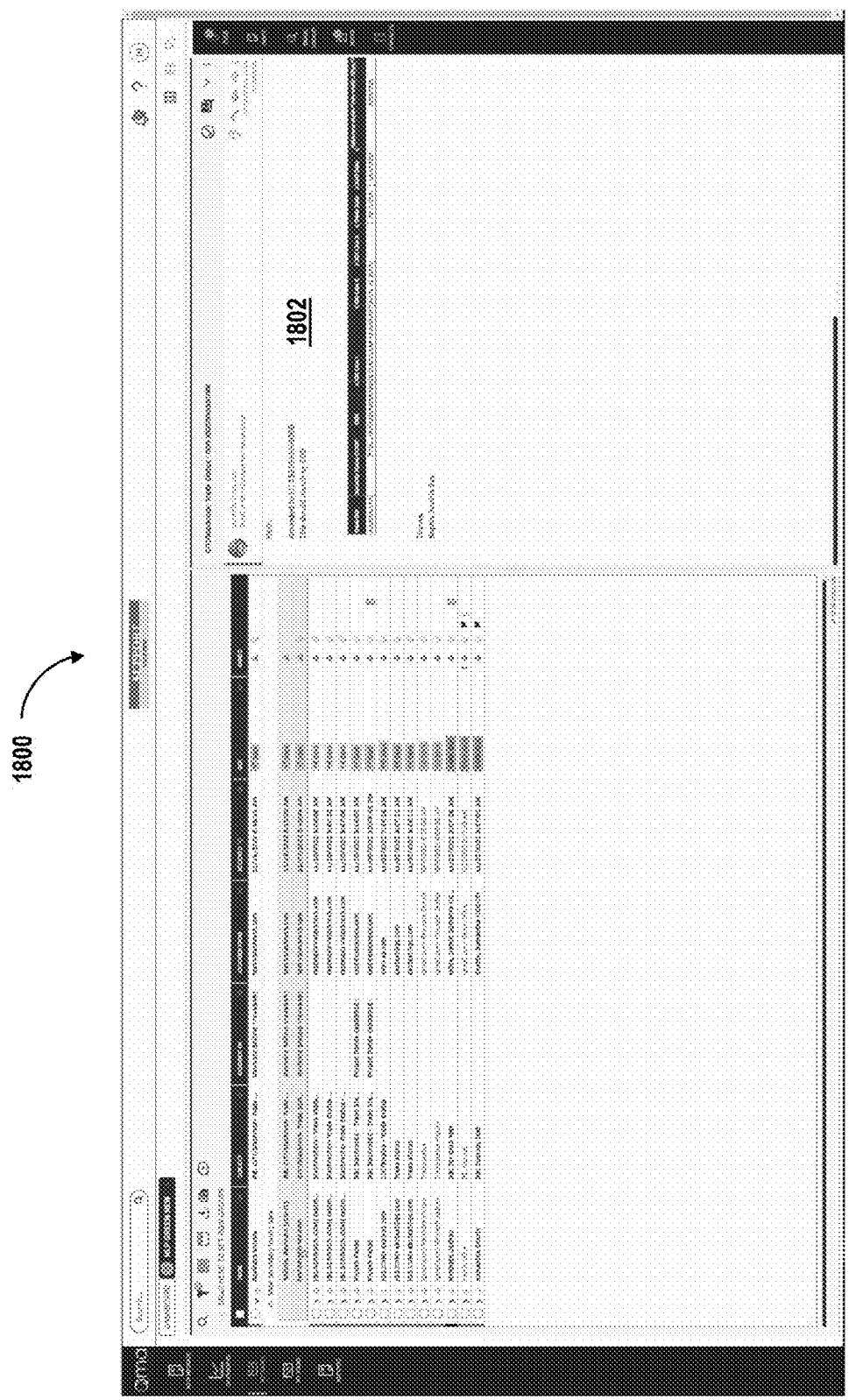
FIG. 18 depicts a screenshot of an automated reply included in a response electronic mail message in accordance with an embodiment.

Using the content of the electronic mail message, the message handling application 155 may generate a query for information to send to a search platform (e.g., for searching an internal dataset). The query may be generated in response to presence of keywords or phrases within the content correlated with the query for information. For instance, the message handling application 155 may identify that the electronic mail message includes keywords associated with a particular order of securities, and may generate query for the platform using the keywords and identification of the order. The message handling application 155 may receive results from the platform, and use the results to generate the automated response. Examples of the automated generated response may be of the form as seen in FIGS. 17 and 18.

In some embodiments, the response generator 145 executing on the mail management server 105 may generate and provide an automated response for at least one of the electronic mail messages in the user interface 160. The generation of the automated response may be in a similar manner as discussed above. The response may be automatically generated using at a portion of the content (e.g., the header or the body message) of the electronic mail message. In some embodiments, the response generator 145 may detect, identify, or otherwise receive a request to provide an automated response via the user interface 160 or from the contents of the electronic mail message. Using the content of the electronic mail message, the response generator 145 may generate a query for information to retrieve from a search platform. With the results from the platform, the response generator 145 may generate the automated response.

The message handling application 155 may provide a statistic indicator associated with provision of the electronic mail messages to the client 110 in accordance with the distribution list. The statistic indicator may correspond to visualization of the statistics and metrics associated with the electronic mail messages for the client 110, the user, or the overall distribution list, such as percentages of open inquiries, request types, escalations, response rate, and trends, among others. The statistic indicators may be provided upon request by the user, for example, by interaction with the user interface 160 to retrieve statistics. The message handling application 155 may present the statistic indicators in a dashboard of the user interface 160. In some embodiments, the metric tracker 150 executing on the mail management server 105 may provide and present statistics in a similar manner as discussed. Examples statistics are shown on FIGS. 3-5.

Figure 2:
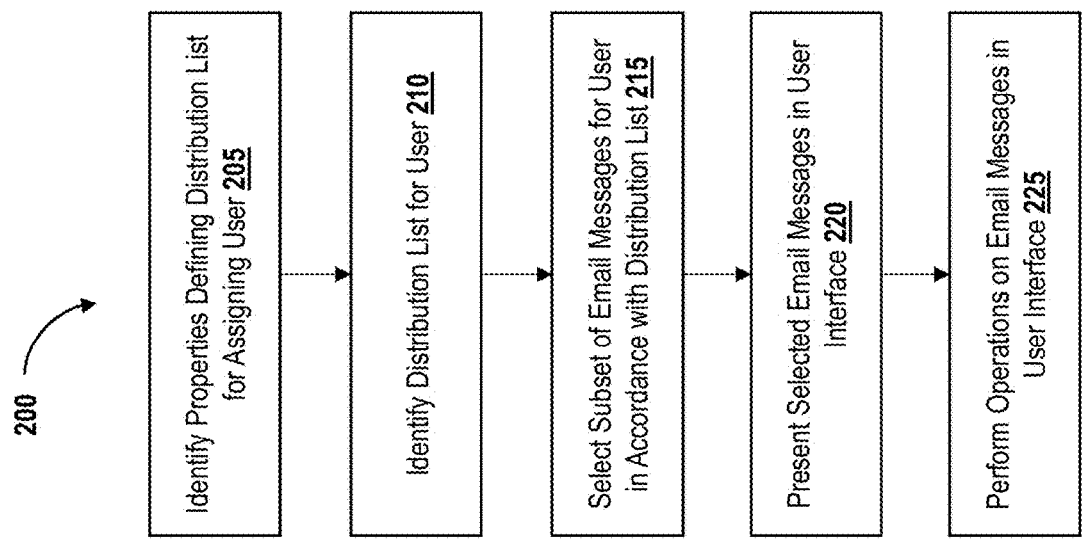
FIG. 2 depicts a flow diagram of an example method of managing and handling electronic mail messages in accordance with an illustrative embodiment.

FIG. 2 depicts a flow diagram of a process 200 of managing and handling electronic mail messages. Embodiments may include additional, fewer, or different operations from those described in the process 200. The process 200 may be performed by any of the components described herein, for example, the mail management system 105 and the client 110 of FIG. 1. At step 205, a computing system may identify properties defining a distribution list for assigning a user. The properties may identify or include, for example: a user identifier referencing the user, the client, or the individual instance of an application; a request type of electronic mail messages the user is to be assigned to respond to; a geographic region or location in which the user is located; group identifier referencing which group the user belongs to in an organization or association; and other information At step 210, the computing system may identify a distribution list for a user. The computing system may maintain a set of distribution lists to which to assign users. Each distribution list may define or specify a combination of parameters (e.g., request types and group identifiers) with which to assign the user to the respective distribution list. In identifying, the computing system may compare the one or more properties from the user with the specification of parameters for each distribution list. If the properties from the user do not match the specification, the computing system may refrain from assigning the user to the distribution list. Otherwise, if the properties from the user match the specification, the computing system may assign, set, or otherwise associate the user to the distribution list At step 215, the computing system may select a subset of electronic mail messages for the user in accordance with the distribution list. The selection may be from electronic mail messages intended to be received by the user. Each electronic mail message may include a header (e.g., sender, recipients, message identifier, and subject) and a body message, among others. Each distribution list may specify criteria (e.g., keywords or phrases) for selecting electronic mail messages. The computing system may perform the selection by scanning the electronic mail message to determine whether the message contains any matching keywords or phrases. If there are matching keywords or phrases, the computing system may select the electronic mail message.

At step 220, the computing system may present the selected electronic mail messages in a user interface. The computing system may provide an identification of the selected electronic mail messages. The identification may reference the selected electronic mail messages to be brought to the user's attention in a message list. The computing system may also provide instructions to the application to display the selected electronic mail messages separately from the unselected messages in the user interface.

At step 225, the computing system may perform various operations on the electronic mail messages on the user interface. Upon presentation, the computing system may provide one or more functionalities with respect to the electronic mail messages. For instance, upon request, the computing system may provide an email to chat conversion, a chat to email conversion, automated response generation, calendar managements, and file attachments, among others.

Figure 3:
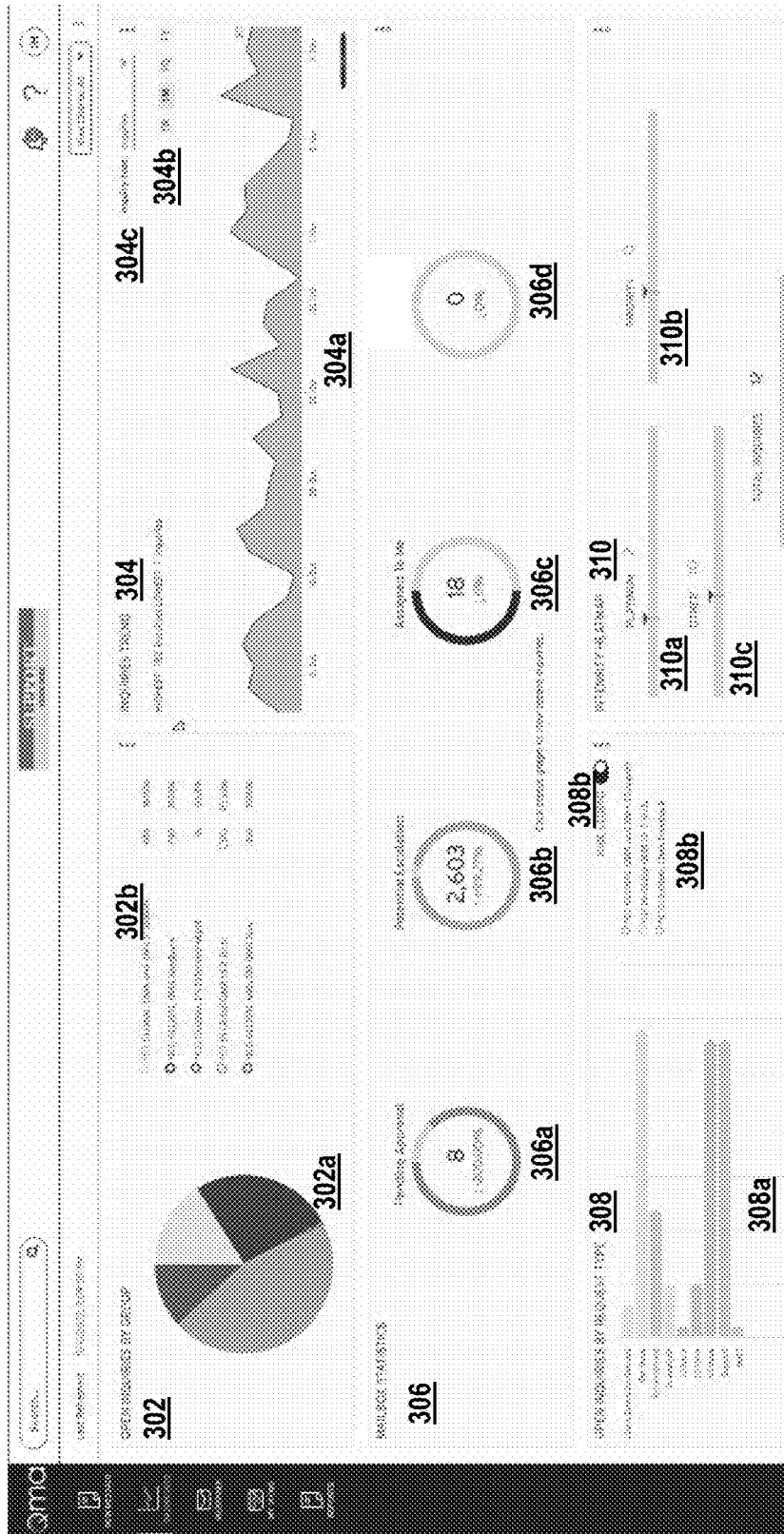
FIG. 3 depicts a screenshot of a dashboard of mailbox statistics displayed via an interface in accordance with an embodiment.

Referring now to FIG. 3, depicts a screenshot of a dashboard graphical user interface 300 of mailbox statistics displayed via an interface. The GUI 300 may include various graphics to display certain message statistics 302-310 to a user via a computing device. As depicted, the message statistics displayed on GUI 300 may include open inquiries by group 302; inquiries trend 304; mailbox statistics 306, including pending approval 306*a*, potential escalation 306*b*, assigned to me 306*c*, and specific client 306*d*; open inquiries by request type 308; and intensity heatmap 310, among others.

The open inquiries by group 302 may include a graphical illustration 302*a* to depict each group's open inquiries as a percentage of all open inquiries. In some embodiments, the graphical illustration 302A is a pie chart. In other embodiments, the graphical illustration 302A is any graphical illustration that can be used to compare percentages of a whole (e.g., a bar graph, a histogram, a scatter plot, etc.). The Open Inquiries by Group may also include a legend 302*b* for the graphical illustration 302A. Legend 302B may use various visualizations to map the information based in the graphical illustration 302A to the legend information found in legend 302B.

The Inquiries Trend 304 may include a graphical illustration 304A to depict the number of messages received over time in a group. In some embodiments, the graphical illustration 304A is a timeline. According to some embodiments, the x-axis of the graphical illustration 304A is time and the y-axis is the number of messages received. Additionally, in some embodiments, a time option 304A to change the time period displayed on the x-axis. In some embodiments, a user is able to choose between various time periods (e.g., one day, one week, one month, one year, etc.) for which to view the number of messages received by selecting one of the options available at time option 304A.

Upon selecting a time period, graphical illustration 304A may be automatically rescaled to the appropriate time period, corresponding to the option chosen by user. In some embodiments, the x-axis of graphical illustration 304A may be divided into several smaller time periods to aid in viewing the data. The GUI 300 may be divided along the x-axis automatically based on an appropriate division of time with respect to the option chosen by the user at option 304B. In some embodiments, the user may select a custom time division for the x-axis. In addition, the inquiries trend 304 may also include an inquiry option 304C. Inquiry option 304*c* may include a visual element with which the user may interact with to select a specific message or inquiry type to display statistics on. The statistics displayed may be the timeline of number of messages/inquiries received over time with the chosen message or inquiry type.

The mailbox statistics 306 may include a group's or individual's various mailbox statistics 306A-306D, including Pending Approval 306A, Potential Escalation 306B, Assigned to Me 306C, and Specific Client 306D. Mailbox statistics 306A-D may include a graphical illustration to aid in displaying the statistics. In addition, the mailbox statistics 306A-D may include a total number of messages relating to the corresponding statistic with a change in percentage from a previous time period. In some embodiments, the change in percentage may be color-coded so as to easily communicate to the user whether a particular statistic increased or decreased. For example, a positive percentage change (e.g., qualitative or quantitative) may be displayed in a first color (e.g., green font). Conversely, a negative percentage change (e.g., qualitative or quantitative) may be displayed in a second color (e.g., red font). Also, a static percentage (e.g., a percentage change of "0") may be displayed in a third color (e.g., yellow font).

The open inquiries by request type 308 may include a graphical illustration 308A. The graphical illustration 308A may display the number of messages/inquiries received by an individual or group, divided by the type of message or inquiry. For example, graphical illustration 308A may be a bar graph with various distinct message types and displays the number of each message type by quantity received, as shown in FIG. 3. According to other embodiments, the graphical illustration 308A may be an alternative graph type (e.g., pie graph, scatter plot, histogram, etc.). As with open inquiries by group 302, open inquiries by request type 308 may include a legend 308B to aid the user in deciphering the data displayed in graphical illustration 308A. Open inquiries by request type 308 may also include an option 308C to hide the legend 308B. Option 308C may be visual element capable of receiving various inputs. For example, option 308C may be a radio button, text string input, slider, dial, or drop-down menu, among others.

The Intensity Heatmap 310 may also include various graphical illustrations 310A-C. The Intensity Heatmap 310 may depict the amount of messages having a particular priority handling, such as a highest priority 310*a* (e.g., platinum), a second priority 310*b* (e.g., priority), and a third priority or other status 310*c*. The Intensity Heatmap 310 may be useful in illustrating how the messages are allocated to the various priority statuses, which may be helpful in allocating the workflow.

Figure 4B:
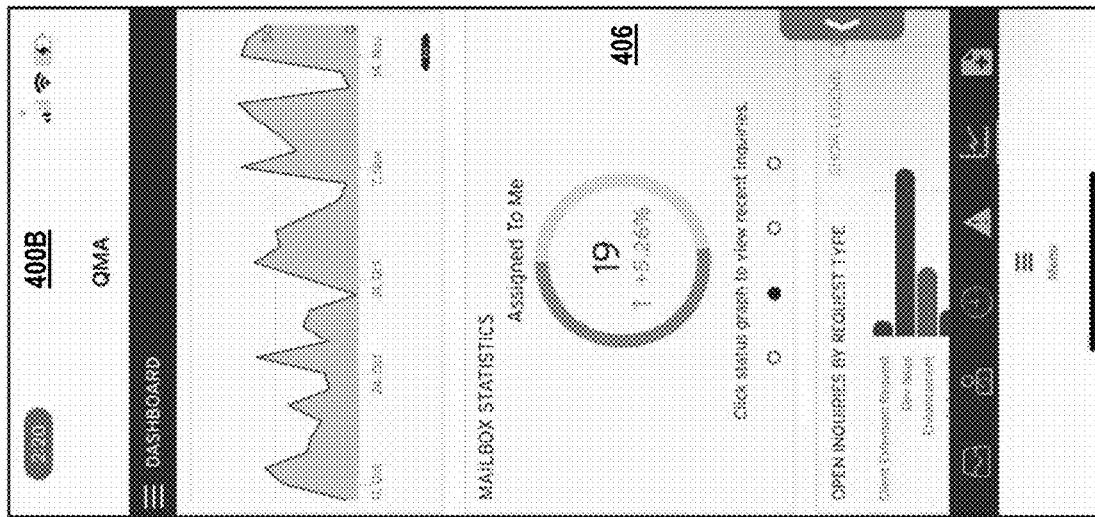
FIGS. 4A and 4B each depict a screenshot of a dashboard of mailbox statistics displayed via an interface for a mobile device, in accordance with an illustrative embodiment.
Figure 4A:
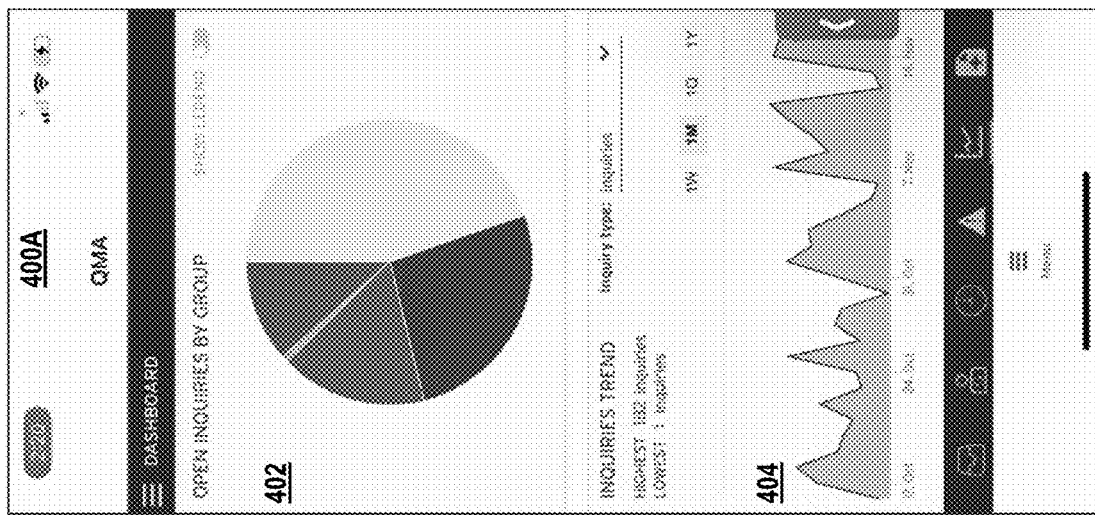

Referring now to FIGS. 4A and 4B, each depict a screenshot of a dashboard of mailbox statistics displayed via an interface for a mobile device. The statistical information displayed the mobile device. The webserver or local hosting agent may display the statistical dashboard 400A-B through a web-based browser on the user's mobile device. The statistical data (with accompanying options and legends) displayed on statistical dashboard GUI 300 of FIG. 3 may be displayed on statistical dashboards 400A-B. As depicted here, the statistical dashboard 400A-B may be sized to fit the form of a mobile device. For example, the mailbox statistics 402-406 may be vertically displayed so as to allow the user to scroll vertically on a mobile device to view the mailbox statistics 402-406.

Figure 5:
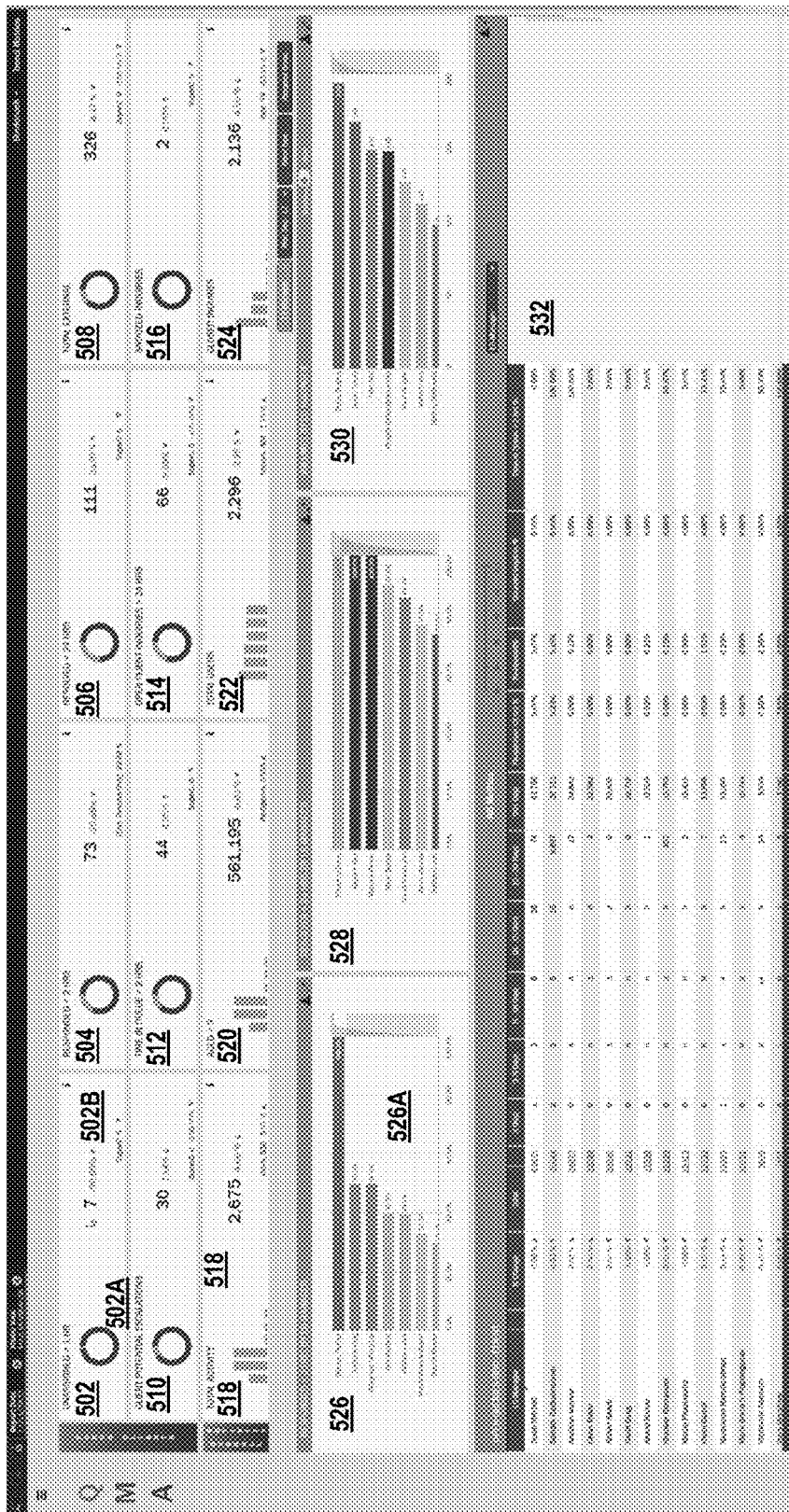
FIG. 5 depicts a screenshot of a window of various statistics displayed via an interface for a mobile device, in accordance with an illustrative embodiment.

Referring now to FIG. 5, depicted is a screenshot of a dashboard GUI 500 of various statistics displayed via an interface for a mobile device. The statistical dashboard GUI 500 may be displayed in a web-based browser on a computing device. The statistical dashboard GUI 500 may include several statistical analyses 502-532 of a given mailbox. The mailbox may represent a single user's mailbox, a distribution mailbox, a group mailbox, etc. As such, the statistical analyses 502-532 may communicate information on both individual mailboxes and distribution/group mailboxes. Statistical analyses 502-532 may display statistics on (1) messages unassigned for greater than one hour 502, (2) messages responded to in less than two hours 504, (3) messages resolved in less than twenty-four hours 506, (4) total external messages 508, (5) client potential escalations 510, (6) messages in the queue for more than two hours 512, (7) client inquiries open for more than twenty-four hours 514, (8) snoozed inquiries 516, (9) total activity 518, (10) messages aged over three days 520, (11) total users 522, (12) closed inquiries 524, (13) a comparison between users responding to messages in less than two hours 526, (14) a comparison between users resolving to messages in less than twenty-four hours 528, (15) a comparison between users' total messages 530, and (16) messages dead on delivery 532, among others.

The detailed statistical dashboard GUI 500 may prioritize statistics based on metrics tracking a clients' experience rather than the user's productivity by displaying client-experience statistics first as shown in the statistical analyses 502-516. Overall statistics 518-524 may be displayed under the client-experience statistics 502-516. The user may also customize the view of the detailed statistical dashboard by choosing which statistical analyses 502-532 to include, in what order to include, and what format to display. As with the GUI 300 of FIG. 3, the statistical analyses 502-532 may use graphic illustrations to display the statistical information provided on the dashboard. For example, a percentage graph 502a may use two colors to show what percentage of total messages meet a specified criteria (e.g., number of messages unassigned for more than two hours).

Likewise, the graphical illustration may include a change-in-percentage indicator 502b. The change-in-percentage indicator 502b may use a color-coded format to visually display changes in percentage. For example, change-in-percentage indicator 502b may use a first font color (e.g., green) to signify a positive change in percentage of messages unassigned for over an hour (e.g., positive qualitatively or quantitatively). A second font color (e.g., red) may be used to signify a negative change in percentage of messages unassigned for over an hour (e.g., negative qualitatively or quantitatively). A third font color (e.g., yellow) may be used to signify no change in percentage of messages unassigned for over an hour (e.g., no change qualitatively or quantitatively).

Detailed statistical dashboard GUI 500 may also include statistical analyses 526-530, wherein multiple users' statistics are comparatively displayed. For example, user-comparison graph 526A may display, in a bar graph, a subset of users with corresponding data related to a specified organizational metric. For example, in user-comparison graph 526A, users are compared based on how many messages each user responded to within two hours of receipt. In this graphical illustration, a user (e.g., a manager or administrator) may more readily track individual users' metrics when compared to other users. If the number of selected users to compare is too large to fit within the predefined space for comparison graph 526A, the user may scroll within the predefined space for comparison graph 526A to view all available data. A user may customize the detailed statistical dashboard GUI 500 by defining the set of users or groups to compare. The user may define the set of users or groups to compare in a variety of ways, including radio buttons, drop-down menus, text string input, etc. In this way, the user may view one subset of users in one viewing configuration, and then view a second subset of users in a second viewing configuration.

Referring now to FIG. 6, depicted is a screenshot of a dialogue box 600 for selecting parameters to define a distribution list to which to assign a user. The dialogue box 600 may be for specifying request types and ownership for a distribution list 602. As illustrated, a user may define the criteria (i.e., "request type") 606 for a message to be assigned to a distribution list 602. A user may also specify the owners 604 for a distribution list 602.

In some embodiments, a user may select a distribution list 602 from a list of distribution lists found within the distribution list dialogue box 600. For example, dropdown menu 610 may include all available distribution lists for a user to select. Once a distribution list (e.g., 602) is selected, a user may define the members of the distribution list (i.e., owners 604). Selected owners 604 receive all messages meeting distribution list's message characteristics 606 (i.e., request type).

In distribution list dialogue box 600, the user may also define the distribution list's message characteristics 606 of the messages assigned to distribution list 602. For example, a user may define a distribution list message characteristic 606 to be certain content within the body of a message (e.g., inquiries on a financial trade, bank statement, credit card inquiry, lending request, etc.). Distribution list message characteristics 606 may also include certain recipients (e.g., all messages going to a team lead may be sent to the team distribution list), certain senders (e.g., all messages coming from a client may be sent to the client distribution list), time or receipt (e.g., all messages received after hours may be sent to the after-hours distribution list), etc.

Figure 7:
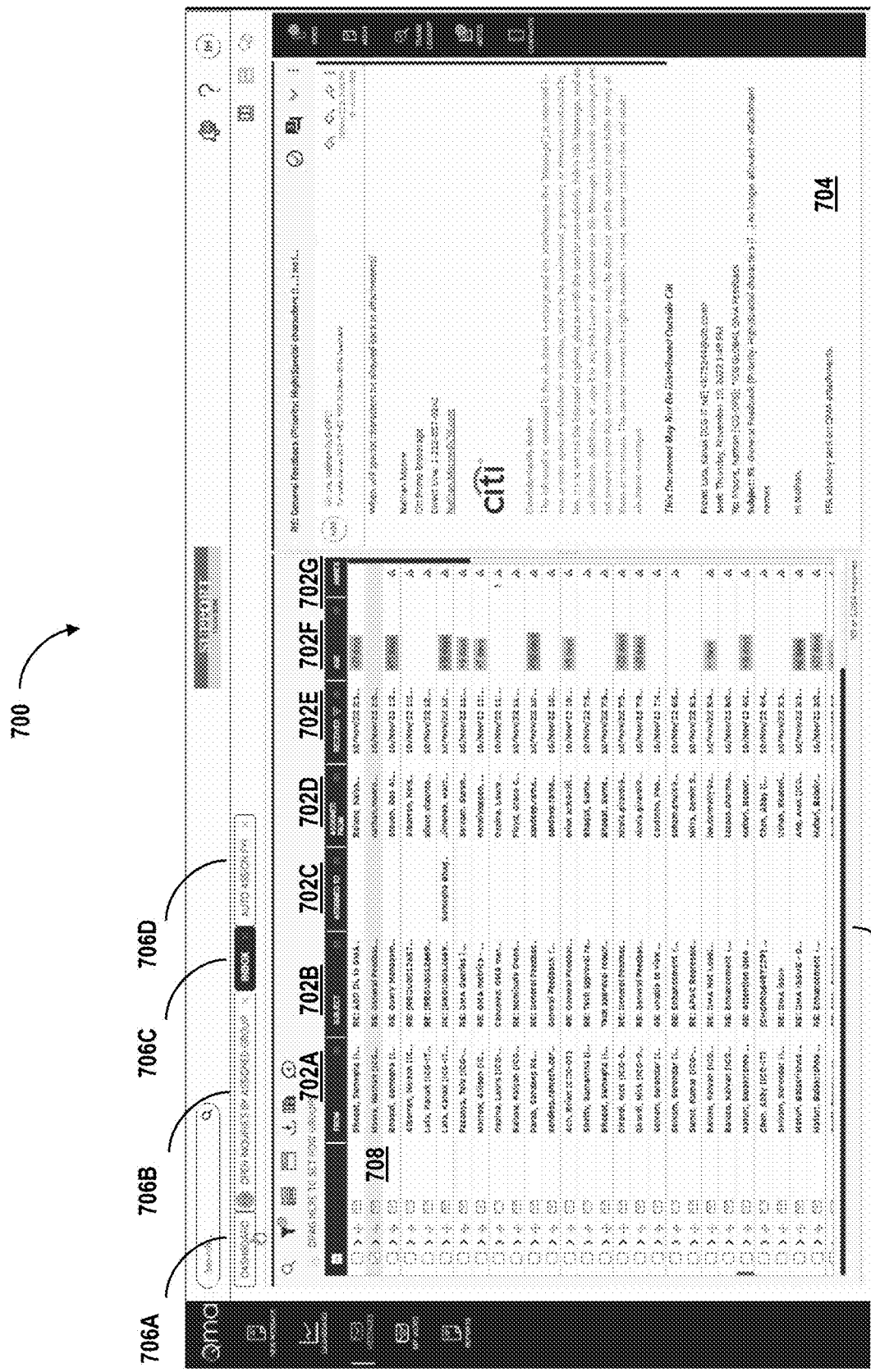
FIG. 7 depicts a screenshot of an interface of an application including a message list and a message panel in accordance with an illustrative embodiment.

Referring now to FIG. 7, depicted is a screenshot of an interface 700 of an application including a message list and a message panel. The interface 700 may include an electronic mailbox 702 (also herein referred to as a message list) with accompanying message panel 704. In this configuration, the messages selected using the Distribution List Manager 120 may be displayed in the user's electronic mailbox 702 vertically in a list. Because the messages are selectively sent to the user based on artificial intelligence, natural language processing, machine learning, and user input, a reduction of junk mail and irrelevant messages are received by the user.

The provision of electronic mail messages in this manner may drastically reduce the amount of mail the user receives. Because of this, the user may utilize the electronic mailbox 702 as a "to-do" list, with only actionable and relevant emails arriving at the inbox. Various relevant data categories are displayed for each email. For example, "from" 702A, "subject" 702B, "assigned to" 702C, "assigned from" 702D, "received" 702E, "age of message" 702F, "possible escalation" 702G, among others are displayed.

The electronic mailbox 702 may be configurable to be filtered according to the various relevant data categories. Additionally, the user may click and drag individual messages within the list of messages to customize the order of messages to the user's preference. In this way, the user may further utilize the electronic mailbox 702 as a "to-do" list by deciding which messages reside at the top of the list of messages, and thus may command more attention of the user. In addition to the electronic mailbox 702, the interface 700 includes a message panel 704. Once a user selects a message 708 from the electronic mailbox 702, the full message populates in the message panel 704.

Figure 8:
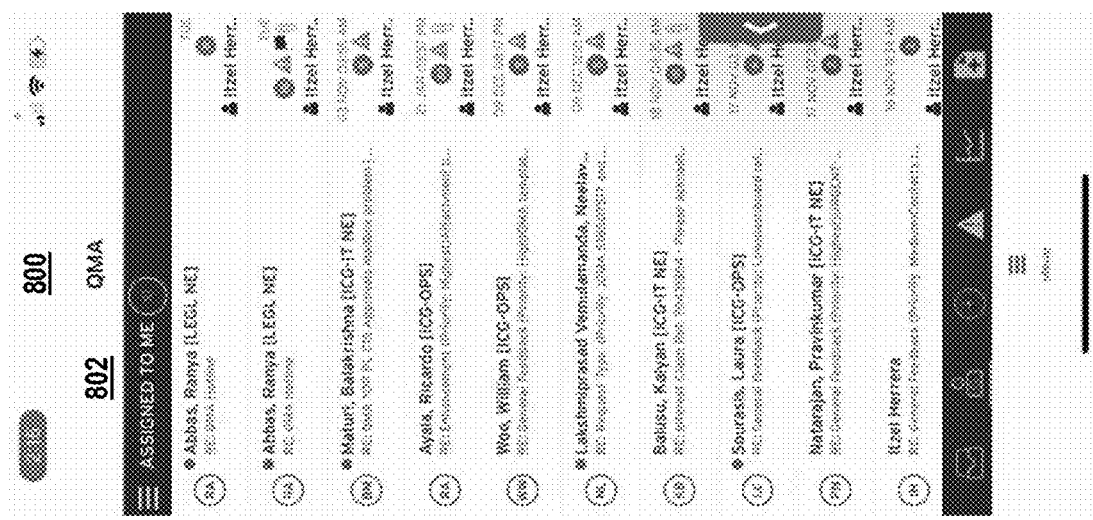
FIG. 8 depicts a screenshot of an interface of an application for a mobile device including a message list in accordance with an illustrative embodiment.
Figure 9:
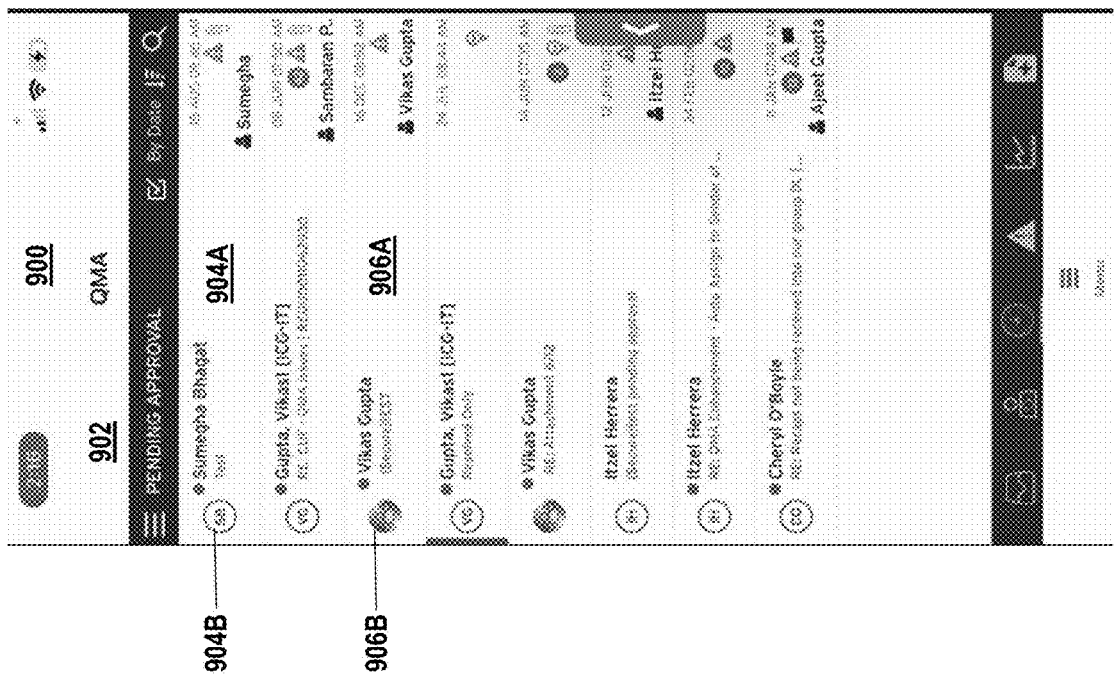
FIG. 9 depicts a screenshot of an interface of an application for a mobile device including a message list with indicators regarding approval in accordance with an illustrative embodiment.
Figure 10:
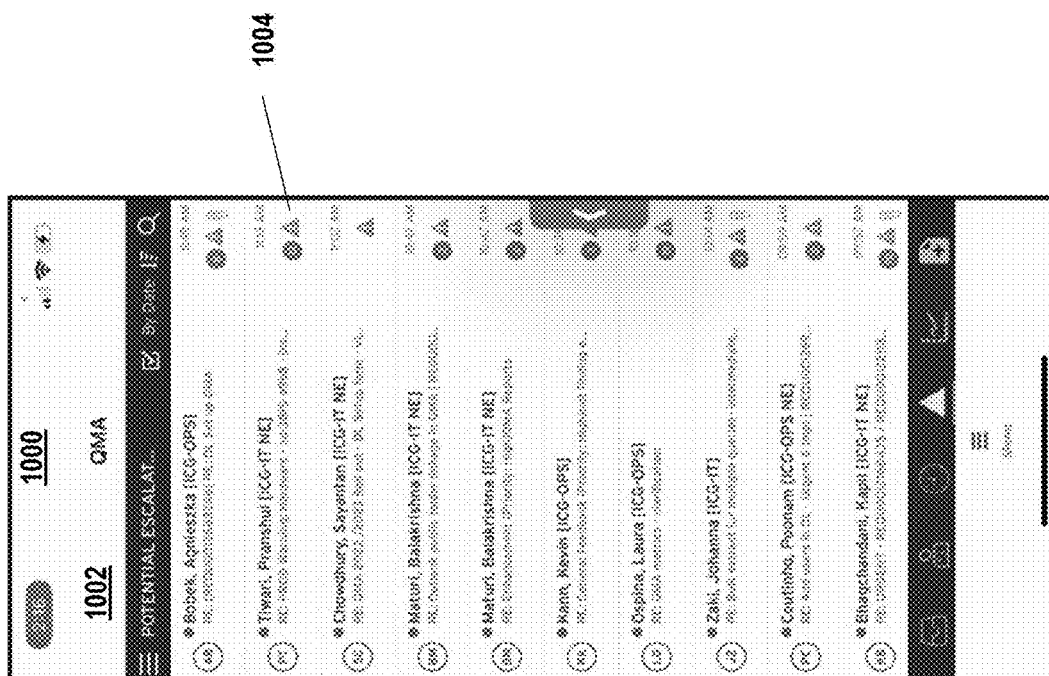
FIG. 10 depicts a screenshot of an interface of an application for a mobile device including a message list with indicators for potential escalations in accordance with an illustrative embodiment.

A user's electronic mailbox may also be displayed by the mail management server 105 of FIG. 1 in a mobile application. As with the message center 700 of FIG. 7, the mobile electronic mailbox of FIGS. 8-10 may be set to various predefined filtered views which may filter the user's messages from various messaging platforms (e.g., email, chat, text message, etc.) for specific work flows. For example, FIG. 8 depicts an electronic mailbox 800 in a filtered "Assigned to Me" view, FIG. 9 depicts an electronic mailbox 900 in a filtered "Pending Approval" view, and FIG. 10 depicts an electronic mailbox 1000 in a filtered "Potential Escalation" view. Additional filtered views exist, including user-customized filter views. In these filtered views, select messages meeting the filtered view's filtering criteria are shown. In this way, a user's electronic mailbox shows only the relevant messages to a user.

Referring now to FIG. 8, depicted is a screenshot of an interface 800 of an application for a mobile device including a message list. As in the interface 700, the interface 800 may display the messages selected using the distribution list. Various relevant data categories may be displayed for each message, for example "from," "subject," "assigned to," "assigned from," "received," "age of message," "possible escalation," "read/unread status," "attachments," "type of message" (e.g., conversation thread, email, chat, etc.), among others. The interface 800 is configurable to be filtered according to the various relevant data categories described above. Additionally, the user may click and drag individual messages within the list of messages to customize the order of messages to the user's preference. In this way, the user may further utilize the interface 800 as a "to-do" list by deciding which messages reside at the top of the list of messages, and thus may command more attention of the user. The interface 800 may include the filtered "Assigned to Me" view 802, according to one embodiment. The messages specifically assigned to the user may be filtered for the user to view.

Referring now to FIG. 9, depicted is a screenshot of an interface 900 of an application for a mobile device including a message list with indicators regarding approval. If there are no messages assigned to the user then the user is presented with a second filtered view; the "Pending Approval" view 902 of FIG. 9. In some embodiments, a user may select for a sent message to remain pending until a second user approves the message for sending. A user may elect to request approval before sending a message for various reasons. For example, a user may elect to request approval when a message contains confidential information, a message is to an important client, the message has an attachment that is to be reviewed, etc.

In the "Pending Approval" view 902, a user may view messages that are pending that user's approval. These messages, while resident in a first user's "Pending Approval" view 902, may be in multiple user's "Pending Approval" view, per the use of distribution lists manager 120 and assignment handler 125 as described herein. In this way, various users may award approval to the pending approval requests. Once approval has been awarded, the message may be hidden from the mailbox of each user who was assigned the message. The interface 900 may include a characterization of the source of each message displayed. For example, email icon 904B may characterize the message 904A as being an email while chat message 906B may characterize the message 906A as being a chat message from a distinct messaging platform.

Referring now to FIG. 10, depicted is a screenshot of an interface 1000 of an application for a mobile device including a message list with indicators for potential escalations. The interface 1000 may be in a third, filtered view, a "Potential Escalation" view 1002. In some embodiments, various messages may be determined to be escalated in an electronic mailbox when certain criteria are met. For example, if an actionable message (i.e., a received message requesting a response) has not been responded to in a predefined set of time (e.g., within twenty-four hours), the message may be escalated.

In other words, the message may be sent to more users within a distribution list for which the message was previously hidden. These other users may be coworkers in the same distribution list, or even a manager. This may ensure that a message is responded to in due course by bringing attention to a pending message. To avoid this escalation, a precursor to escalation, called "potential escalation," may be carried out. In some embodiments, a message may be sent to (or unhidden from) additional users within a distribution list if an actionable message is not responded to within a predefined set of criteria. For example, if a message will be escalated at twenty-four hours after receipt, it may become potentially escalated at two hours to ensure an escalation does not occur.

In the "Potential Escalation" view 1002 (as well as in the other filtered views), if a message is at risk of potential escalation, the escalation may be indicated by a visual element 1004. In some configurations, the visual element is a red triangle with an exclamation point within. The visual element 1004 can be any indicator to draw the user's attention to the potential escalation risk, including animations, graphics, sounds, etc. The visual element may be an interactive element, so that when a user hovers an input device (e.g., a mouse cursor) over the visual element 1004, the reason for the risk of potential escalation appears in a dialogue box (e.g., too much time has passed since receipt of the message.). In "Potential Escalation" view 1002, a user may be presented only with messages are characterized.

In some embodiments, the users will be directed to the "Potential Escalation" view 1002 if there are no messages in the "Assigned to Me" view 802 of FIG. 8 or the "Pending Approval" view 902 of FIG. 9. In this way, a user may be directed to the most relevant messages in a predefined sequential order. The criteria for the various filtered views described above may be defined by the user or the organization (e.g., through a manager, administrator, etc.). Likewise, the default view (and subsequent order of displayed views) may also be defined by the user or the organization (e.g., through a manager, administrator, etc.). Likewise, a user may define their own personalized filtered view based on the various message data described above (e.g., to, from, subject, etc.).

Figure 11:
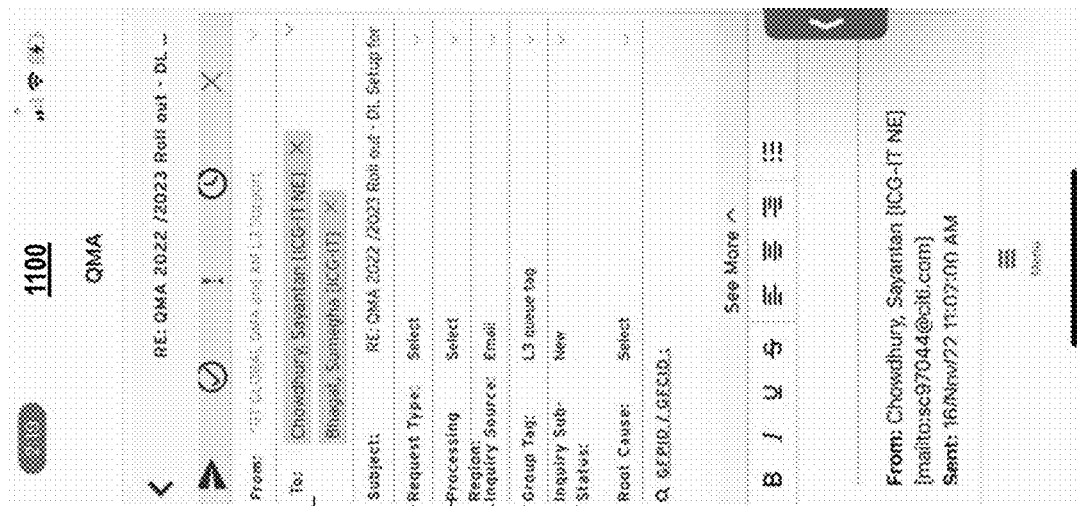
FIG. 11 depicts a screenshot of an interface of an application for a mobile device including a message with various tags in accordance with an illustrative embodiment.

Referring now to FIG. 11, depicted is a screenshot of an interface 1100 of an application for a mobile device including a message with various tags. By using various input fields 1102A-F, a user may tag a message within their electronic mailbox. The tagging may occur through any variation of input selection including drop-down menus, text string input, radio buttons, etc. From tagging a message, a user may manually move messages between distribution lists, update message characteristics, etc. For example, upon receipt of a message, the mail management server 105 may assign the message to User 1 based on (1) the contents of the message and (2) the roles of users within Distribution List 1 (of which User 1 is a member). That message would appear in User 1's electronic mailbox, specifically in User 1's "Assigned to Me" view 802 of FIG. 8. User 1 may realize that the message is not meant for the User 1, but rather, for a different group of users in Distribution List 2. User 1 may open the message's tagging dialogue box 1100 to change the Group Tag 1102E. Upon changing the Group Tag 1102E, the message will be unassigned from User 1 (and the rest of the assigned users in Distribution List 1) and reassigned to a subset of users within Distribution List 2 who are most likely to be responsible for the message and any corresponding tasks.

Once the mail management server 105 assigns an actionable message (i.e., an email requiring a response) to a user, the user (or other assigned user) may be assigned to resolve the assignment by completing the assigned task or otherwise dispatching it (e.g., assigning it to another user, tagging the message as not actionable, etc.). In some embodiments, actionable messages are called "queries." In some embodiments the mail management server 105 automatically may mark an actionable message as resolved based on a user's interaction with the message (e.g., if the user assigns the message to another user or distribution list, if the user responds to the email, if the user deletes the email, etc.).

Figure 12:
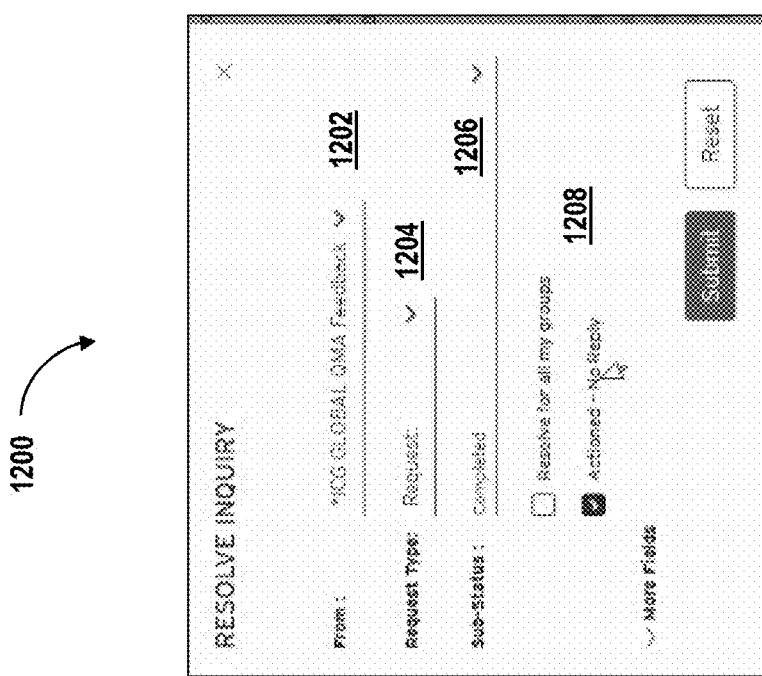
FIG. 12 depicts a screenshot of a dialogue box for an inquiry resolution in accordance with an illustrative embodiment.

Referring now to FIG. 12, depicted is a screenshot of a dialogue box for an inquiry resolution. A user may manually tag a message as resolved once the user has dispatched of the actionable message (i.e., the query). The Resolve Inquiry dialogue box 1200 is shown. A user may arrive at the dialogue box 1200 from the user's electronic mailbox (as shown in FIGS. 8-10) and selecting a resolve-inquiry visual element embedded in the page that corresponds to the actionable message. The user may then use the various input fields 1202-1208 to tag the actionable message as dispatched. If the user does not need to reply to an inquiry, the user can mark the inquiry as resolved, such as checkbox 1208 for "actioned—no reply." The action of resolving can also automatically generate an email message to interested parties that confirms the resolution of the inquiry. By resolving an inquiry, the inquiry is removed from being an actionable item that appears for each user.

Figure 13:
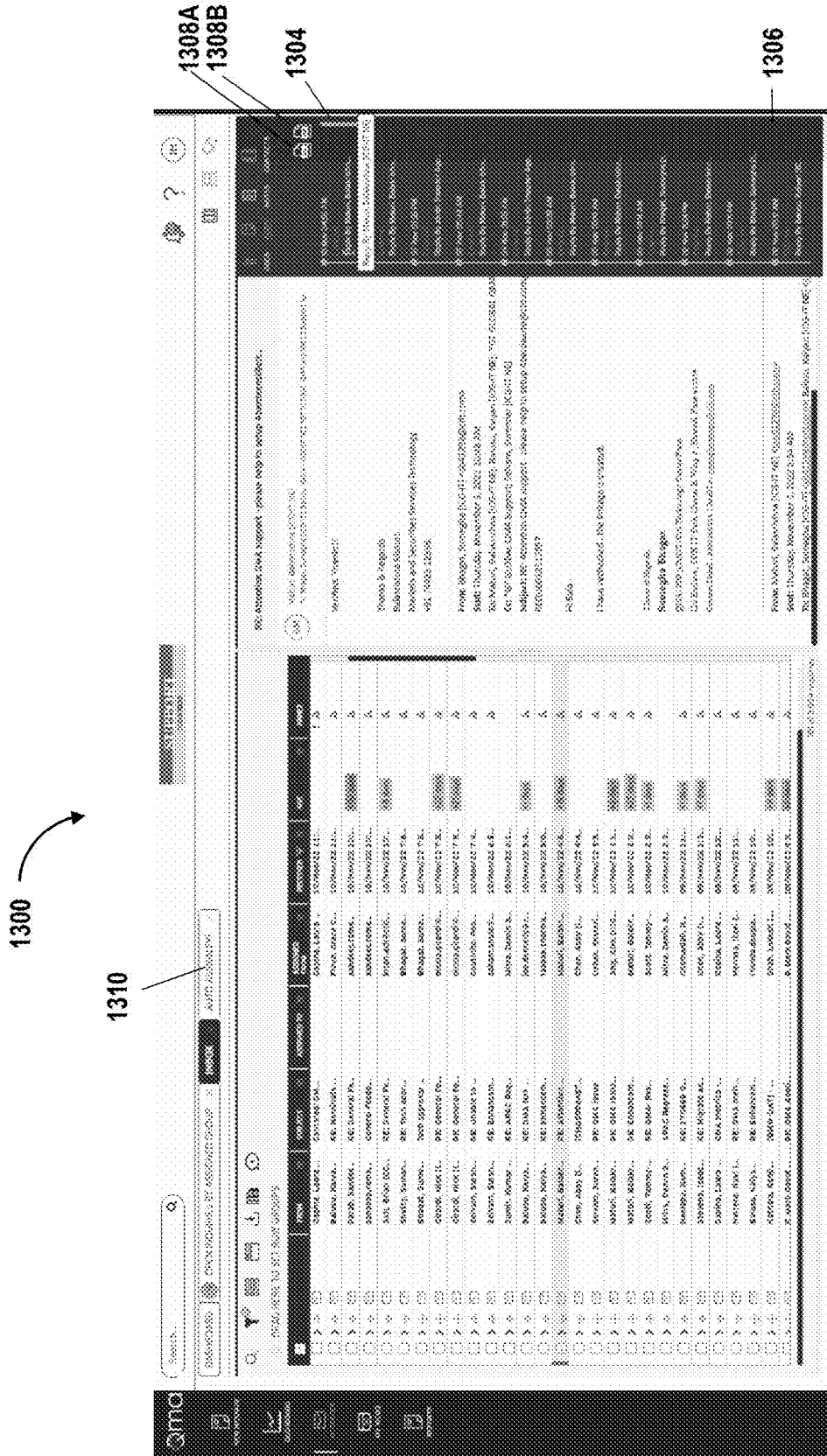
FIG. 13 depicts a screenshot of an interface of an application including a message list and a message panel with a side panel including an audit of events in accordance with an illustrative embodiment.

Referring now to FIG. 13, depicted is a screenshot of an interface 1300 of an application including a message list and a message panel with a side panel including an audit of events. In the interface 1300, an audit timeline 1304 is displayed in conjunction with other user interface elements. In this configuration, the audit timeline 1304 may be displayed for viewing in the user's message center 1300. The audit timeline 1304 may be a snapshot of all events that have occurred in the life of the message from receipt, and may include entries for every event occurring therein. For example, once a message is received by the mail management server 105, a first entry may be created in the timeline. This event contains and displays relevant data concerning the message for the user to view in relation to the rest of the timeline. This data may include the sender, the recipient, the subject, time of receipt, whether the message is internal or external, etc. By selecting the message within the timeline, the user may access additional data not displayed in the default view. This additional information may include any attachments included with the message, the actual text of the message, any embedded metadata, geographical location of sender and recipient, etc. Once an action is performed with respect to the message (e.g., responding, adding a note, forwarding, etc.) a new event 1306 is created in the timeline with all corresponding information.

A user may create and access a file containing all of the information found in the audit timeline 1304. In some configurations, there is a first visual element 1308A, through which a user may download a spreadsheet of the audit-timeline information by selecting the first visual element 1308A with a user's input device (e.g., a mouse cursor). In some configurations, there is also a second visual element 1308B, through which a user may download a PDF file containing the audit-timeline information by selecting the second visual element 1308B with a user's input device (e.g., a mouse cursor).

FIG. 13 depicts an Auto Assign button 1310. When a message is delivered to a distribution list having a plurality of users, the message may be automatically assigned to a particular user or group of users. The message will be automatically moved from the inbox to an Auto Assign folder. Removing the message from the inbox allows users to more efficiently handle those messages that have not been assigned to others and may still need resolution. Adding the message to the Auto Assign folder allows the users to check the folder to confirm that the message has been assigned to that user or another user. As a result, the Auto Assign functionality may further increase efficient use of this mailbox system. The message may appear in the inbox, but the system will automatically remove the message and present it in a different box for viewing so that the user does not need to respond to the message in the inbox.

Referring to FIGS. 12 and 13, in one embodiment, an artificial intelligence model may be trained on previous inquiries and resolutions. The artificial intelligence model may automate an assignment of an inquiry based on how previous inquiries were routed and handled until resolution. The artificial intelligence model may also be trained to respond with a resolved confirmation or to mark as resolved without a reply. The artificial intelligence model may be configured to automatically assign inquiries and automatically move messages from an inbox to an Auto Assign box as appropriate.

Figure 14:
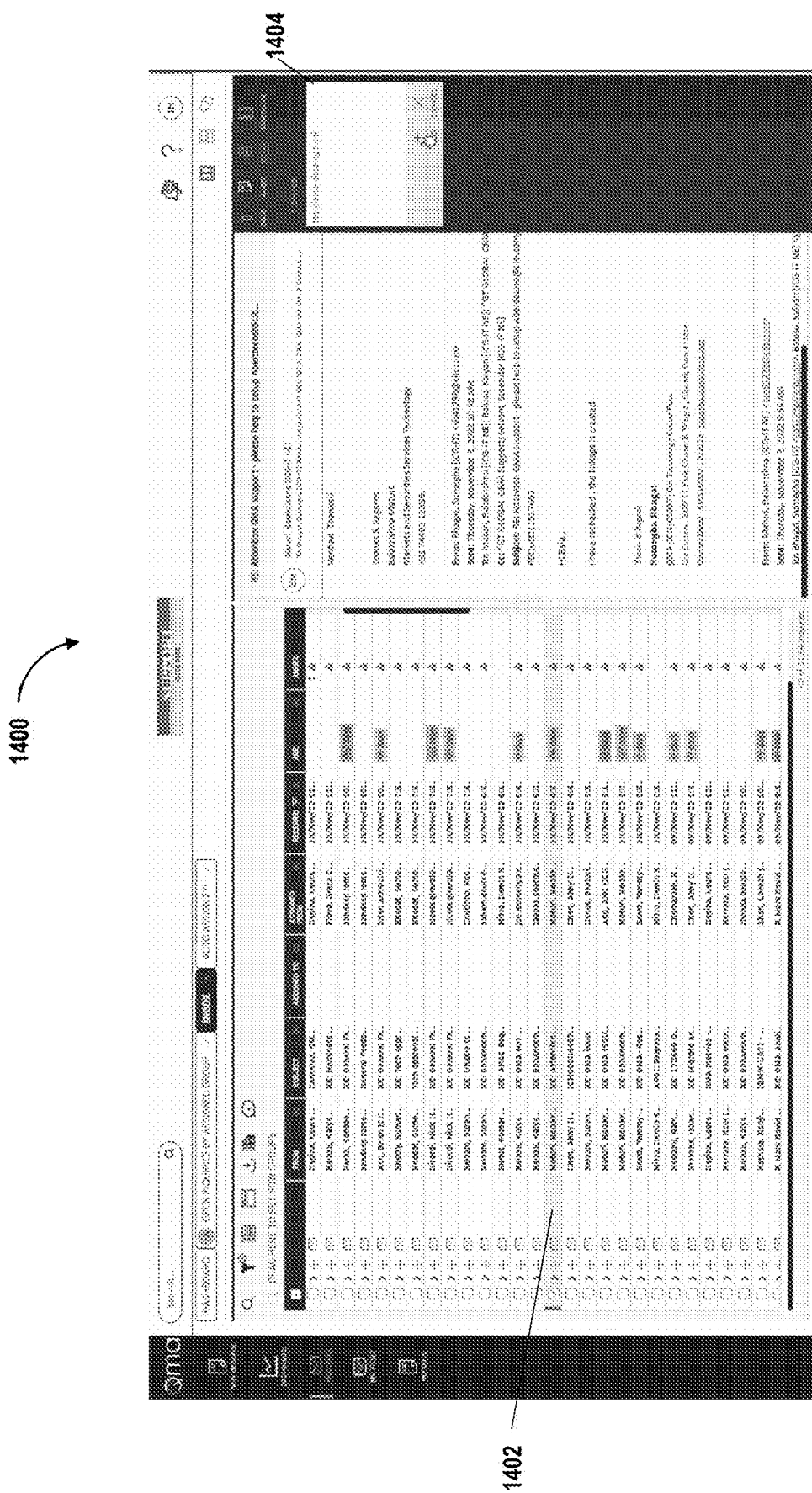
FIG. 14 depicts a screenshot of an interface of an application including a message list and a message panel with a side panel including notes in accordance with an illustrative embodiment.

Referring now to FIG. 14, depicted is a screenshot of an interface 1400 of an application including a message list and a message panel with a side panel including notes. In the interface 1400, a note-taking feature 1404 is displayed in conjunction with other user interface elements. In this configuration, the note-taking feature 1404 is displayed for viewing in the user's message center 1400. The note-taking feature 1404 is available for the user to include notes in conjunction with a selected message 1402. Any notes created by a user in conjunction with a selected message 1402 are attached to the selected message 1402 for internal users to view. Notes added through the note-taking feature 1404 may be accessible by internal users of the mail management server 105. In this way, internal users may communicate with each other about a selected message without creating additional messages within the user's message center 1400 or exposing their comments to external parties.

Figure 15:
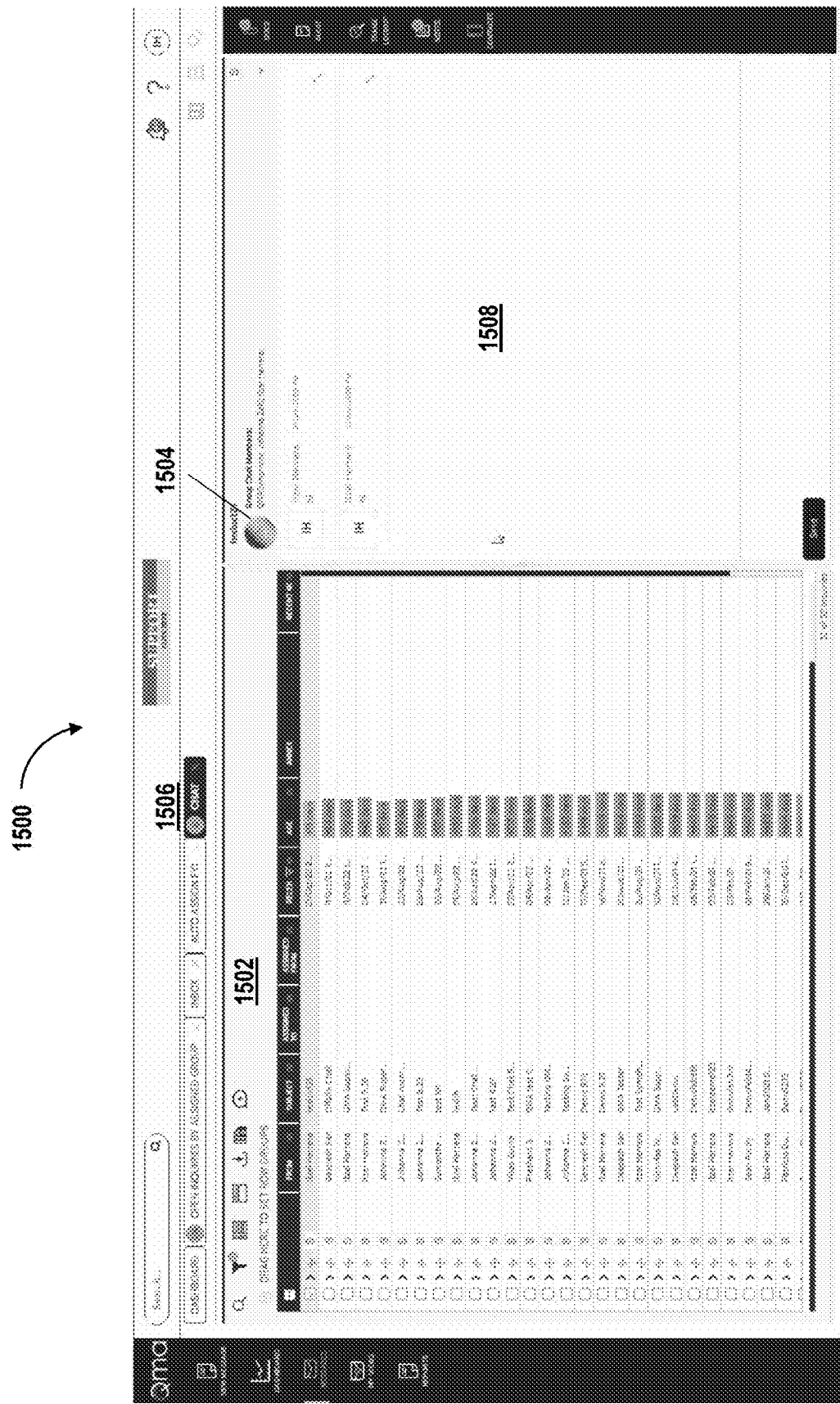
FIG. 15 depicts a screenshot an interface of an application including a message list and a message panel with an electronic mail thread converted to a chat conversation thread, in accordance with an illustrative embodiment.

Referring now to FIG. 15, depicted is a screenshot an interface 1500 of an application including a message list and a message panel with an electronic mail thread converted to a chat conversation thread. In this configuration, a user may integrate various chat platforms 1504 with the mail management server 105. With this integration, a user may monitor various chat messaging platforms in the same location as the user's electronic mail. The user may filter the electronic mailbox 1502 to show only chat messages by selecting a chat visual element 1506. In other embodiments, the electronic mailbox 1502 may show electronic mail and chat messages in a single inbox. Using the chat integration 1508, the user may replay to chat messages from a separate chat platform while from inside the message center 1500. This allows the user to monitor and reply to electronic messages from any platform in a single location, thus increasing efficiency and productivity for the user.

Figures 16A, 16B:
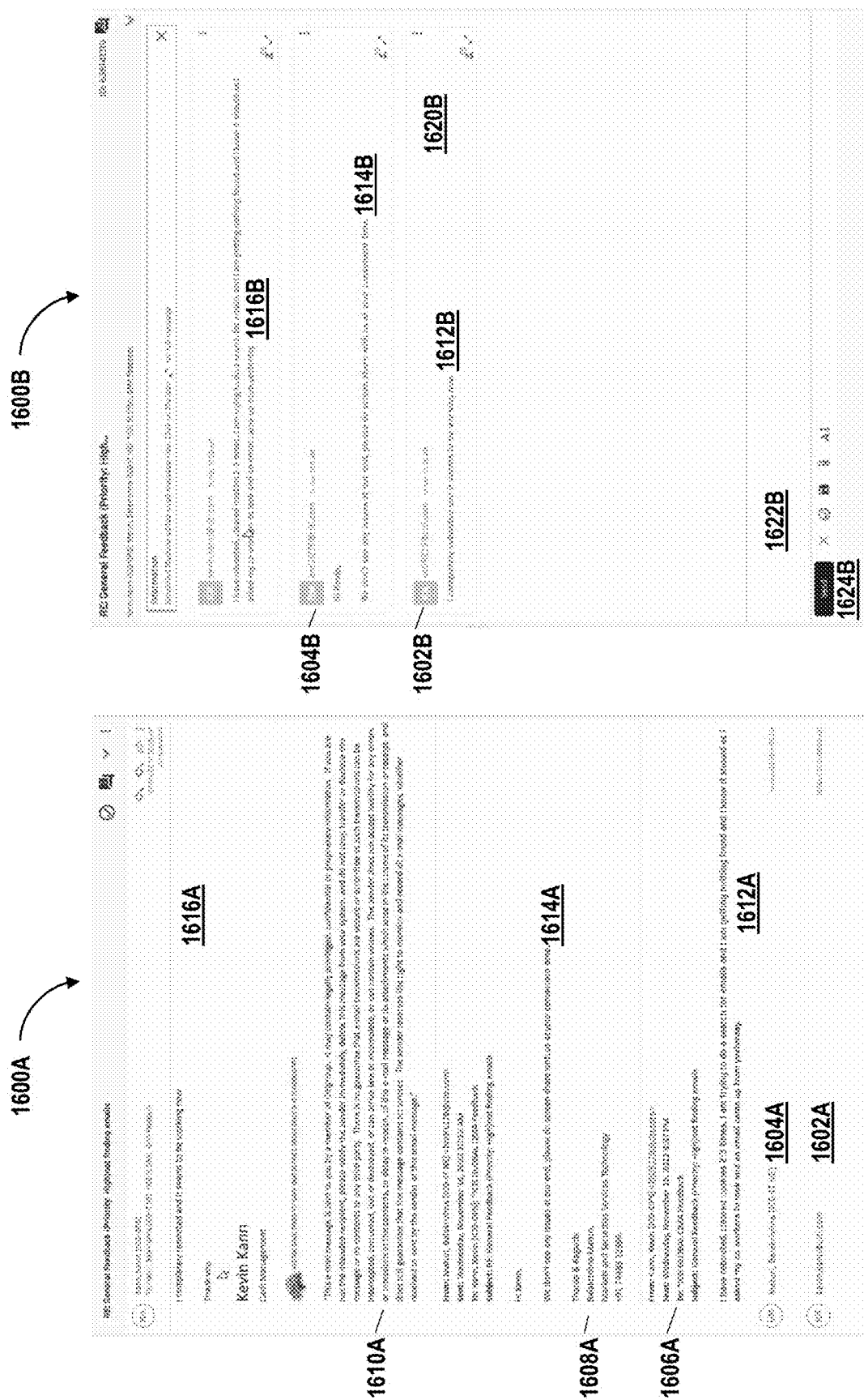
FIG. 16A depicts a screenshot of a selected electronic mail thread with multiple messages in accordance with an illustrative embodiment.
FIG. 16B depicts a screenshot of a chat conversation thread converted from the electronic mail thread in accordance with an illustrative embodiment.

Referring now to FIG. 16A, depicted is a screenshot of a selected electronic mail thread 1600A with multiple messages. The thread 1600A may be between a first participant 1602 and a second participant 1604. In this configuration, the email thread 1600 may contain various conversationally extraneous elements (i.e., auxiliary content) 1606A-1610A in addition to the conversationally relevant elements (main content) 1612A-1616A. With this example, the main content 1612A-1616A may be between within the auxiliary content 1606A-1610A.

Referring now to FIG. 16B, depicted is a screenshot of a chat conversation thread 1600B converted from the electronic mail thread. The chat conversation thread 1600B between a first participant 1602B and a second participant 1604B. In the chat conversation thread 1600B, the auxiliary content 1606A-1610A of an email may have been removed from view so as to display the email chain as a chat message. In this configuration, the user is able to clearly view the main content 1612B-1616B of the email chain without the extraneous distractions. In this way, the user's productivity may be increased by easing the strain of parsing through auxiliary content, or conversational "refuse." In addition, in some configurations the chat conversation thread 1600B displays the messages as a chat with the most recent message 1620B at the bottom of the thread, as displayed. In the chat conversation thread 1600B, the user may still be using electronic mail (as opposed to a chat platform). The user may reply to the client with email by inputting text in the text string input 1622B and selecting the "Send" graphical input 1624B. While the text string input 1622B and "Send" graphical input 1624B appear as a chat platform, the user replies through electronic mail.

Referring now to FIG. 17, depicted is a screenshot of a dialogue box 1700 for suggested automated responses. In response to a client inquiry, an automated reply may be generated for the user to include in responding to the client. An artificial intelligence (AI) model can be trained to produce automated responses to a variety of client inquiries. In the example, an automated response message 1702 may be generated in response to a client's trade-status inquiry. The automated response message 1702 may be comprised of an introduction 1704, colloquial pleasantries 1706, and the inquiry response 1708. The inquiry response 1708 may include answers several distinct inquiries within a single reply message. The dialogue box 1700 may also include response attachments 1712 that the user may elect to attach to the automated response message 1702. By selectin, a visual selection element 1710, the user may attach relevant data or attachments to the automated response message 1702. Referring now to FIG. 18, depicted is screenshot of an automated reply included in a response electronic mail message 1800. The response message 1800 may include the automated response message 1702 may be generated in response to a client's trade-status inquiry.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of handling messages in networked environments, comprising:
   identifying, by a client device, via a user interface, one or more properties indicating a request type of electronic mail messages to define a distribution list to which to assign a user of the client device;
   transmitting, by the client device, to a server, the one or more properties to assign the user of the client device to the distribution list, with which at least one of a plurality of electronic mail messages to is selected for sending to the client device;
   receiving, by the client device, from the server, an identification of a first subset of electronic mail messages selected from the plurality of electronic mail messages based on an assignment of the user of the client device to the distribution list and the request type determined from content in the first subset of electronic mail messages;
   presenting, by the client device, in the user interface, a message list of the first subset of electronic mail messages;
   receiving, by the client device, via the user interface, a request to present an electronic mail thread corresponding to a second subset of electronic mail messages, as a chat conversation thread,
   identifying, by the client device, from each of the second subset of electronic mail messages, main content and auxiliary content, responsive to the request to present;
   generating, by the client device, the chat conversation thread including the main content identified from each of the second subset of electronic mail messages, while excluding the auxiliary content; and
   presenting, by the client device, in a message panel of the user interface, at least a portion of the chat conversation thread.

2. The method of claim 1, further comprising:
   receiving, by the client device, via the user interface, a request to add a second chat conversation thread from a second application as one of the first subset of electronic mail messages in the message list;
   generating, by the client device, a second electronic mail thread to include a third subset of electronic mail messages corresponding to a plurality of conversations of the second chat conversation thread;
   presenting, by the client device, via the message list, an identification of the electronic mail thread among a plurality of threads.

3. The method of claim 1, further comprising:
   identifying, by the client device, from the first subset of electronic mail messages, an electronic mail message for no response is sent within a defined time window after receipt; and
   providing, by the client device, via the user interface, an indicator identifying the electronic mail message as having no response within the defined time window.

4. The method of claim 1, further comprising
   receiving, by the client device, via the user interface, a request to change assignment of an electronic mail message of the first subset of electronic mail messages to another user;
   transmitting, by the client device, to the server, an indication that the electronic mail message is to be assigned to a second distribution list, responsive to the request to change the assignment of the electronic mail message; and
   removing, by the client device, the electronic mail message among the first subset of electronic mail messages from presentation in the message list.

5. The method of claim 1, further comprising:
   receiving, by the client device, via the user interface, a request to cancel a first calendar event corresponding to one of the first subset of electronic mail messages;
   identifying, by the client device, responsive to the request to cancel, a second calendar event for a time slot at least partially concurrent with the first calendar event; and
   presenting, by the client device, via the user interface, an identification of the second calendar event.

6. The method of claim 1, further comprising providing, by the client device, for at least one message of the first subset of electronic mail messages, a response based on at least a portion of the at least one message.

7. The method of claim 1, further comprising presenting, by the client device, in a dashboard of the user interface, a statistic indicator associated with provision of the plurality of electronic mail messages to the client device in accordance with the distribution list.

8. The method of claim 1, further comprising providing, by the client device, via an attachment window at least partially concurrently with the message list of the user interface, a plurality of attachments available to be added to at least one of the first subset of electronic mail messages.

9. The method of claim 1, wherein the client device comprises a mobile communication device in communication with the server on a cloud computing network, wherein the user interface has a size corresponding to a display of the mobile communication device.

10. A method of managing messages in networked environments, comprising:
    receiving, by a server, one or more properties indicating a request type of electronic mail messages to define a distribution list to which to assign a user associated with a client device of a plurality of client devices;
    identifying, by the server, from a plurality of distribution lists, the distribution list to which to assign the user based on the one or more properties;
    selecting, by the server, from a plurality of electronic mail messages to be sent to the client device, a first subset of electronic mail messages based on assignment of the user to the distribution list and the request type determined from content in the first subset of electronic mail messages;

transmitting, by the server, to the client device, an identification of the first subset of electronic mail messages for presentation in a message list of a user interface;

receiving, by the server, from the client device, a request to present an electronic mail thread corresponding to a second subset of electronic mail messages, as a chat conversation thread, identifying, by the server, from each of the second subset of electronic mail messages, main content and auxiliary content, responsive to the request to present;

generating, by the server, the chat conversation thread including the main content identified from each of the second subset of electronic mail messages, while excluding the auxiliary content; and sending, by the server, to the client device, the chat conversation thread for presentation in a message panel of the user interface.

11. The method of claim 10, further comprising:

receiving, by the server, from the client device, a request to add a second chat conversation thread from a second application as one of the first subset of electronic mail messages in the message list;

generating, by the server, a second electronic mail thread to include a third subset of electronic mail messages corresponding to a plurality of conversations of the chat conversation thread; and sending, by the server, to the client device, an identification of the electronic mail thread among a plurality of threads for presentation in the message list.

12. The method of claim 10, further comprising:

identifying, by the server, from the first subset of electronic mail messages, an electronic mail message for no response is sent within a defined time window after receipt; and sending, by the server, to the client device, an indicator identifying the electronic mail message as having no response within the defined time window via the user interface.

13. The method of claim 10, further comprising:

receiving, by the server, from the client device, a request to change assignment of an electronic mail message of the first subset of electronic mail messages to another user;

identifying, by the server, from a plurality of users, a second user to which to assign the electronic mail message based on the request to change; and sending, by the server, to a second client device associated with the second user, an identification of the electronic mail message.

14. The method of claim 10, further comprising:

receiving, by the server, from the client device, a request to cancel a first calendar event corresponding to one of the first subset of electronic mail messages;

identifying, by the server, responsive to the request to cancel, a second calendar event for a time slot at least partially concurrent with the first calendar event for the user; and sending, by the server, to the client device, an identification of the second calendar event for the user.

15. The method of claim 10, further comprising selecting, by the server, from the plurality of distribution lists, the distribution list for the user based on the one or more properties received from the client device.

16. The method of claim 10, further comprising generating, by the server, for at least one message of the first subset of electronic mail messages, a response based on at least a portion of the at least one message.

17. The method of claim 10, wherein the server comprises at least one of a mail exchange server or a dedicated server for interfacing with an application for handling messages executing on the client device.

18. The method of claim 10, wherein the server is distributed in a cloud computing network in communication with the plurality of client devices.

\* \* \* \* \*